(12) United States Patent
Kim et al.

(10) Patent No.: US 11,516,329 B2
(45) Date of Patent: Nov. 29, 2022

(54) MOBILE TERMINAL AND AUXILIARY DEVICE CONNECTED THERETO

(71) Applicant: LG ELECTRONICS INC., Seoul (KR)

(72) Inventors: Gihwan Kim, Seoul (KR); Seoungho Baek, Seoul (KR); Bumseok Shon, Seoul (KR); Daeyoung Lee, Seoul (KR); Hyoyeol Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 208 days.

(21) Appl. No.: 16/647,378

(22) PCT Filed: Sep. 5, 2019

(86) PCT No.: PCT/KR2019/011511
§ 371 (c)(1),
(2) Date: Mar. 13, 2020

(87) PCT Pub. No.: WO2021/045272
PCT Pub. Date: Mar. 11, 2021

(65) Prior Publication Data
US 2021/0409533 A1    Dec. 30, 2021

(51) Int. Cl.
*H04M 1/21*    (2006.01)
(52) U.S. Cl.
CPC ..................... *H04M 1/21* (2013.01)
(58) Field of Classification Search
CPC ..................................................... H04M 1/21
See application file for complete search history.

(56) References Cited

U.S. PATENT DOCUMENTS 7,512,426 B2    3/2009    Maatta et al.
8,138,869 B1 *  3/2012    Lauder .................. G06F 1/1656
                                                335/219

(Continued)

FOREIGN PATENT DOCUMENTS

KR    1020110088735    8/2011
KR       101139866     5/2012

(Continued)

OTHER PUBLICATIONS

Korean Intellectual Property Office Application No. 10-2020-7006494, Office Action dated Oct. 29, 2020, 7 pages.

(Continued)

*Primary Examiner* — Hsinchun Liao
(74) *Attorney, Agent, or Firm* — Lee Hong Degerman Kang & Waimey

(57) ABSTRACT

The present disclosure provides an auxiliary device that implements both free-stop hinge and click hinge and includes a seating member forming a seating area for a mobile terminal to implement a neat appearance and a hinge module rotatably connecting the cover member to the seating member, wherein the hinge module includes a holder, a rotation member including a first rotation member fixed to the seating member to form a first rotation axis between the holder and the seating member, and a second rotation member fixed to the cover member to form a second rotation axis between the holder and the cover member, the second rotation axis being parallel with the first rotation axis, and an elastic member configured to elastically press the rotation member to prevent a rotation due to a predetermined magnitude of force or less.

9 Claims, 22 Drawing Sheets

(56) References Cited

U.S. PATENT DOCUMENTS

| | | | | |
|---|---|---|---|---|
| 10,394,062 | B1* | 8/2019 | Song | G06F 1/1652 |
| 10,423,019 | B1* | 9/2019 | Song | H04M 1/022 |
| 2002/0147026 | A1* | 10/2002 | Hsieh | H04M 1/0216 |
| | | | | 455/575.3 |
| 2007/0084015 | A1* | 4/2007 | Zuo | H04M 1/0216 |
| | | | | 16/354 |
| 2010/0275413 | A1* | 11/2010 | Kim | H04M 1/0216 |
| | | | | 16/303 |
| 2012/0024576 | A1* | 2/2012 | Su | H02G 15/18 |
| | | | | 174/254 |
| 2015/0257289 | A1* | 9/2015 | Lee | G06F 1/1641 |
| | | | | 361/749 |
| 2016/0054759 | A1 | 2/2016 | Lee et al. | |
| 2017/0207829 | A1 | 7/2017 | Morris et al. | |
| 2018/0049336 | A1 | 2/2018 | Manuel et al. | |

FOREIGN PATENT DOCUMENTS

| | | |
|---|---|---|
| KR | 1020160023471 | 3/2016 |
| KR | 1020190007788 | 1/2019 |
| KR | 1020190028809 | 3/2019 |
| WO | 2011-093552 | 8/2011 |

OTHER PUBLICATIONS

PCT International Application No. PCT/KR2019/011511, International Search Report dated Jul. 1, 2020, 4 pages.
European Patent Office Application Serial No. 19856423.9, Search Report dated Jan. 4, 2022, 8 pages.

* cited by examiner (a)

(b)

(a)

(b)

(c)

MOBILE TERMINAL AND AUXILIARY DEVICE CONNECTED THERETO

CROSS-REFERENCE TO RELATED APPLICATIONS

This application is the National Stage filing under 35 U.S.C. 371 of International Application No. PCT/KR2019/011511, filed on Sep. 5, 2019, the contents of which are all hereby incorporated by reference herein in its entirety.

TECHNICAL FIELD

This disclosure relates to a mobile terminal and an auxiliary device coupled and/or connected to the mobile terminal to provide enhanced usability to a user.

BACKGROUND ART

Mobile terminals refer to handheld computing devices that can be carried by a user, rather than being fixed at a specific location. A typical example of the mobile terminals is a smart phone.

Functions of the mobile terminals are diversified more and more. For example, there are functions regarding data and voice communication, photographing and video recording through a camera, voice recording, music file reproduction through a speaker system, and outputting of images or videos on a display. Some mobile terminals include and implement an electronic game playing function. In particular, recently developed mobile terminals are capable of receiving a multicast signal for providing a visual content such as a broadcast, a video, and a TV program.

With the diversified functions of the mobile terminals, the mobile terminals have been implemented as multimedia players having complex functions, such as photographing a photo, recording a video, playing a music or video file, playing a game, receiving a broadcast content, and the like.

In particular, standardization of 5G communication have been widely spread and used, there are many cases of taking advantages of the 5G communication, such as a fast speed, a low latency, and the like. For example, multiple devices using a communication network may be linked to each other and thus enabled to interact with each other without latency or transmit and receive large-scale data seamlessly to use the data.

In accordance with this trend, the development of a multitasking method such as outputting a plurality of contents on a large screen or outputting a plurality of contents on a plurality of screens has been continuously made. For example, a mobile terminal is coupled to an auxiliary device and an additional display is provided in the auxiliary device to implement a plurality of displays.

The auxiliary device having the additional display may include a seating member and a cover member. The mobile terminal may sit in and coupled to the seating member. The cover member may include an additional display. The cover member may be disposed to be rotatable with respect to the seating member. An aspect of use may vary based on a degree to which the cover member is opened, closed and fixed relative to the seating member.

When the cover member rotates at an angle between 0° and 360° relative to the seating member, a user may grip and use the mobile terminal in a state in which the cover member is fully opened at 360° without need to remove the auxiliary device. However, when the cover member and the seating member is connected using a one-axis hinge, the auxiliary device may be provided in an excessively large size due to restrictions on design of a connector, or the additional display is not disposed parallel to the display of the mobile terminal.

Meanwhile, a free-stop hinge may be provided to use the cover member and the seating member fixed at a preset angle such that the additional display and the display of the mobile terminal are used simultaneously. However, a fixing structure for suppressing an external torque of the free-stop hinge is usually provided in a hinge-axis direction and thus, may occupy a large space.

Even in a case of the auxiliary device in which the free-stop hinge is implemented, the cover member may be fixed at another angle by a restoring force instead of a desired angle (which is called a backlash phenomenon). The backlash phenomenon may be problematic since the cover member is not completely closed even when a desired angle between the cover member and the seating member is 0°.

Also, to electrically connect the mobile terminal and the additional display, a circuit through which the cover member and the seating member are electrically connected may be required. However, the circuit may be structurally unstable in an area connecting the seating member and the cover member.

DISCLOSURE OF INVENTION

Technical Goals

An aspect provides a case-type auxiliary device providing an additional display to solve an issue that the auxiliary device excessively increases in size or restricted on design to employ a cover member rotating by 360° to be opened, an issue that a backlash phenomenon occurs in implementing a free-stop hinge, and an issue that a stress is applied to a circuit due to the cover member being opened and closed repetitively when the circuit is provided all over the seating member and the cover member.

Technical Solutions

According to an aspect, there is provided an auxiliary device including a seating member configured to form a seating area of a mobile terminal, a cover member connected to one edge of the seating member, and a hinge module configured to rotatably connect the cover member to the seating member. The hinge module includes a holder, a rotation member including a first rotation member fixed to the seating member to form a first rotation axis between the holder and the seating member, and a second rotation member fixed to the cover member to form a second rotation axis between the holder and the cover member, the second rotation axis being parallel with the first rotation axis, and an elastic member configured to elastically press the rotation member to prevent a rotation due to a predetermined magnitude of force or less.

The elastic member may include a pressing portion including a metal material. The pressing portion may be provided in a ring shape to cover at least a portion of a circumference of the rotation member, and is cut or opened at one point.

The pressing portion may include a first pressing portion configured to cover the first rotation member, a second pressing portion configured to cover the second rotation member, and a fixing portion configured to connect the first pressing portion and the second pressing portion. The first pressing portion, the second pressing portion, and the fixing portion may be formed integrally.

The elastic member may have a wire shape. The pressing portion may include a plurality of unit wires stacked in a direction of the first rotation axis, each of the unit wires being wound once and fixed.

In the elastic member, each of the unit wires may be stacked separately.

In the elastic member, neighboring unit wires may be mutually connected to form a single wire wound a plurality of times.

The auxiliary device may include a first cam and a first roller respectively provided in the first rotation member and the holder and configured to relatively rotate in response to rotation of the first rotation member to change a degree of mutual pressurization, and a second cam and a second roller respectively provided in the second rotation member and the holder and configured to relatively rotate in response to rotation of the first rotation member to change a degree of mutual pressurization.

The one hinge module may include a seating hole that forms an area in each of the first rotation member and the second rotation member to sit the auxiliary circuit therein, and a guide hole formed in the holder and connecting a seating hole of the first rotation member and a seating hole of the second rotation member to form a seating area of the auxiliary circuit.

Effects

The following are effects of an auxiliary device according to the present disclosure.

According to at least one of embodiments of the present disclosure, it is possible to free-stop a cover member of an auxiliary device.

Further, according to at least one of embodiments of the present disclosure, it is possible to implement a click hinge function when a cover member of an auxiliary device is opened and closed.

Further, according to at least one of embodiments of the present disclosure, it is possible to maximize an internal space utilization.

Further, according to at least one of embodiments of the present disclosure, it is possible to prevent a circuit structure and a hinge module from being viewed from outside.

Additional ranges of possibilities will become apparent from the following detailed description. It should be understood, however, that the detailed description and specific examples, such as the preferred embodiments of the invention, are given by way of illustration only, since various changes and modifications within the spirit and scope of the invention will be apparent to those skilled in the art.

BEST MODE FOR CARRYING OUT THE INVENTION

Figure 1:
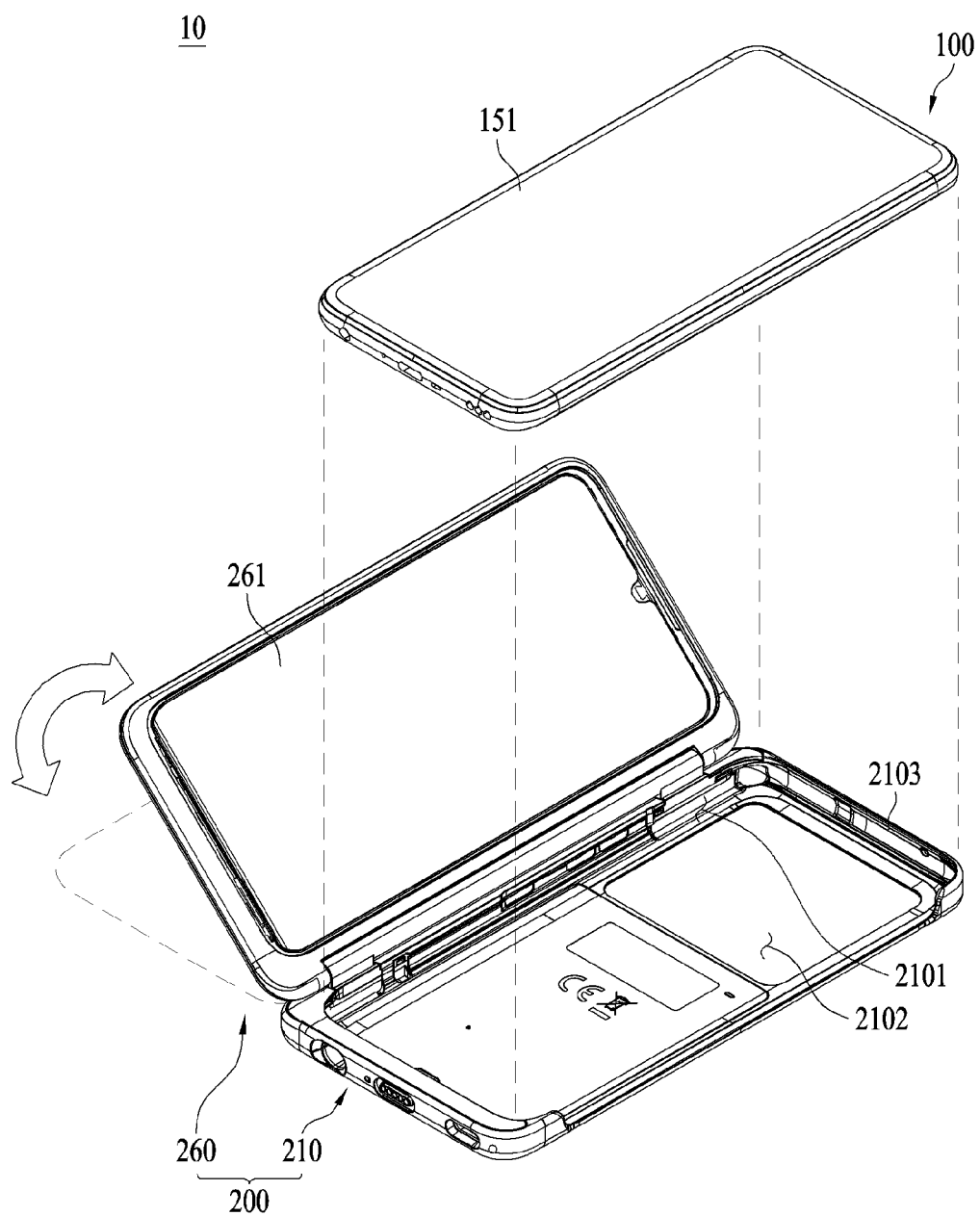
FIG. 1 illustrates a mobile terminal uncoupled from an auxiliary device in a terminal set related to the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present disclosure, moreover, the detailed description will be omitted when a specific description for publicly known technologies to which the invention pertains is judged to obscure the gist of the present disclosure. Also, it should be noted that the accompanying drawings are merely illustrated to easily explain the concept of the invention, and therefore, they should not be construed to limit the technological concept disclosed herein by the accompanying drawings.

The terms 'first', 'second', etc. may be used to describe various components, but the components are not limited by such terms. The terms are used only for the purpose of distinguishing one component from other components.

When an arbitrary component is described as "being connected to" or "being linked to" another component, this should be understood to mean that still another component(s) may exist between them, although the arbitrary component may be directly connected to, or linked to, the corresponding other component. In contrast, when an arbitrary component is described as "being directly connected to" or "being directly linked to" another component, this should be understood to mean that no component exists between them.

A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Figure 2:
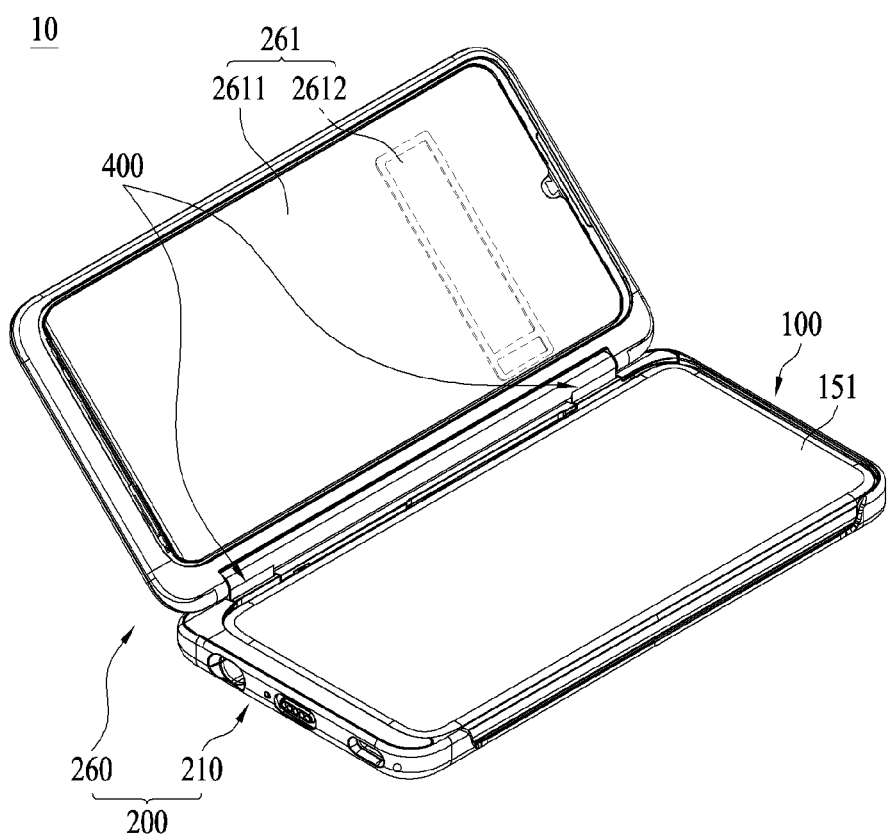
FIG. 2 illustrates a mobile terminal coupled with an auxiliary device.

FIGS. 1 and 2 are conceptual diagrams illustrating a terminal set 10 according to the present disclosure. FIG. 1 illustrates a state in which a mobile terminal 100 is not coupled to an auxiliary device 200 in the terminal set 10 according to the present disclosure, and FIG. 2 illustrates a state in which the mobile terminal 100 is coupled to the auxiliary device 200 in the terminal set 10 according to the present disclosure.

The terminal set 10 according to the present disclosure includes the mobile terminal 100 including a display, and the auxiliary device 200 coupled to the mobile terminal 100 to provide an additional display. The auxiliary device 200 includes a seating member 210 to be coupled to the mobile terminal 100, and a cover member 260 coupled to the seating member 210 to selectively cover the mobile terminal 100 and having the additional display mounted thereon.

As described above, the mobile terminal 100 and the auxiliary device 200 in the terminal set 10 of the present disclosure form output areas, respectively, thereby providing a multi-display and accordingly improving utility. A display provided at the mobile terminal 100 is referred to a main display 151, and a display provided at the auxiliary device 200 is referred to as an auxiliary display 261.

The auxiliary display 261 may be provided both at an inner surface and at an outer surface of the cover member 260. The auxiliary display 261 provided at the inner surface is defined as an inner auxiliary display 2611, and the auxiliary display 261 provided in the outer surface is defined as an outer auxiliary display 2612. When the cover member 260 is unfolded, the inner auxiliary display 2611 may be used to be visible at the same time with the main display. When the cover member 260 is folded, the outer auxiliary display 2612 may be used especially to be visible on the terminal set 10.

The main display 151 and the auxiliary display 261, especially the inner auxiliary display 2611, may be output in conjunction with each other. For example, the main display 151 and the inner auxiliary display 2611 may be output in a mirroring manner, an image being displayed on the main display 151 may be moved to the inner auxiliary display 2611, or an execution image for a single application or execution images for a plurality of applications associated with each other may be output in the main display and the inner auxiliary display 2611 separately. For example, a controller of a game application may be output on the main display 151, and a game content may be output on the inner auxiliary display 2611. That is, the terminal set 10 of the present disclosure may operate as a single device having a plurality of displays, and this implies that various configurations provided at the mobile terminal 100 are shared with the auxiliary device 200.

The outer auxiliary display 2612 may output relatively simple information. For example, the outer auxiliary display 2612 may perform functions of outputting simple text information or image information, such as receiving a call, receiving a message, and setting off an alarm. As the outer auxiliary display 2682 is provided, there is an advantage that information can be confirmed without any additional operation with the cover member 260 closed.

A controller 180 and a power supply 190 of the mobile terminal 100 may supply power not just to the main display 151 but also to the auxiliary display 261, and transmit and receive data. Accordingly, the auxiliary device 200 may operate without an additional controller 180 and the power supply 190. This may reduce the weight or volume of the auxiliary device 200 and cut down a manufacturing costs.

In order to supply power to the auxiliary display 261 and transmit and receive data, the mobile terminal 100 is physically coupled to the auxiliary device 200. The auxiliary device 200 includes a circuit to electrically connect the mobile terminal 100 and the auxiliary display 261, the circuit which is defined as an auxiliary circuit part.

Figure 3:
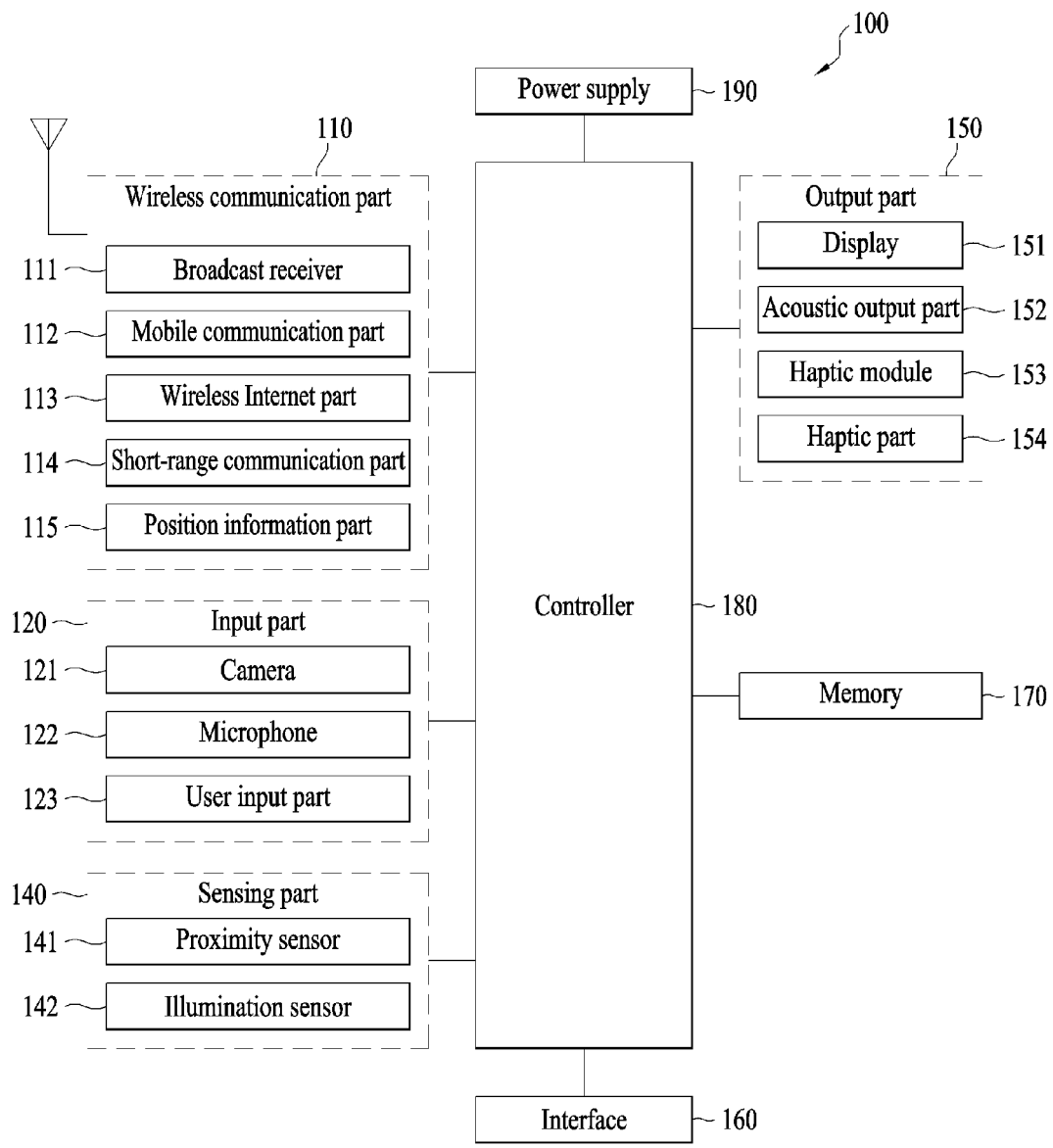
FIG. 3 is a block diagram illustrating a mobile terminal related to the present disclosure.

FIG. 3 is a block diagram of a mobile terminal 100 according to the present disclosure.

The mobile terminal 100 may include a wireless communicator 110, an input part 120, a sensing part 140, an output part 150, an interface 160, a memory 170, a controller 180, and a power supply 190. It is understood that implementing all of the components illustrated in FIG. 3 is not a requirement, and that greater or fewer components may alternatively be implemented.

More specifically, the wireless communicator 110 may include one or more modules which enable communications such as wireless communications between the mobile terminal 100 and a wireless communication system, communications between the mobile terminal 100 and another mobile terminal 100, communications between the mobile terminal 100 and an external server. Further, the wireless communicator 110 typically includes one or more modules which connect the mobile terminal 100 to one or more networks.

The wireless communicator 110 may include one or more of a broadcast receiver 111, a mobile communicator 112, a wireless Internet part 113, a short-range communicator 114, and a location information part 115.

The input part 120 may include a camera 121 for obtaining images or video or an image input part, a microphone 122 for inputting an audio signal or an audio input part, a user input part 123 (for example, a touch key, a push key, and the like) for allowing a user to input information, and the like. Voice data or image data collected by the input part 120 may be analyzed and processed into a user's control command.

The sensing part 140 may include one or more sensors configured to sense at least one of internal information of the mobile terminal 100, the surrounding environment of the mobile terminal 100, or user information. For example, the sensing part 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, the camera 121), a microphone (for example, the microphone 122), a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from two or more sensors of the aforementioned sensors, and combinations thereof.

The output part 150 is configured to generate various types of output, such as audio, video, tactile output, and the like. The display 151 of the mobile terminal 100 correspond to the main display described with reference to FIGS. 1 and 2. The display 151 may be inter-layered with or integrally formed with a touch sensor to facilitate a touch screen. Such a touch screen may provide an output interface between the mobile terminal 100 and a user, as well as function as the user input part 123 which provides an input interface between the mobile terminal 100 and the user.

The interface 160 serves as an interface with various types of external devices that can be coupled to the mobile terminal 100. The interface 160 may include, for example, at least one of a wired or wireless port, an external charging port 161, a wired or wireless data port, a memory card port, a port for connecting a device having an identification module, an audio input/output (I/O) port, a video I/O port, or an earphone port. In some cases, the mobile terminal 100 may perform assorted control functions associated with a connected external device, in response to the external device being connected to the interface 160.

The memory 170 stores data to support various functions or features of the mobile terminal 100. For instance, the memory 170 may be configured to store application programs executed in the mobile terminal 100, data or instructions for operations of the mobile terminal 100, and the like. At least some of the application programs may be downloaded from an external server via wireless communication. At least some of the application programs may be installed within the mobile terminal 100 at time of manufacturing or shipping, which is typically the case for basic functions of the mobile terminal 100 (for example, receiving a call, placing a call, receiving a message, sending a message, and the like). Meanwhile, application programs may be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like inputted or outputted through the above-mentioned components and/or runs application programs stored in the memory 170, thereby processing or providing appropriate information and/or functions to a user.

In order to execute application programs stored in the memory 170, the controller 180 may control at least some of the above-described components described with reference to FIG. 3. Further, in order to execute application programs stored in the memory 170, the controller 180 may control at least two or more of the components included in the mobile terminal 100 in combination.

Under the control of the controller 180, the power supply 190 receives external power or internal power or provide power to each component included in the mobile terminal 100. The power supply 190 may include a battery, and the battery may be an embedded battery or a replaceable battery.

The power supply 190 may be connected with a charging port 161, the charging port 161 may be configured as an example of the interface 160 to which an external charger for supplying power is electrically connected to charge a battery.

At least one portion of the respective components mentioned in the foregoing description can cooperatively operate to implement operations, controls or controlling methods of the mobile terminal 100 according to various embodiments of the present disclosure mentioned in the following description. Moreover, the operations, controls or controlling methods of the mobile terminal 100 can be implemented in the mobile terminal upon execution of at least one or more application programs stored in the memory 170.

Figure 4:
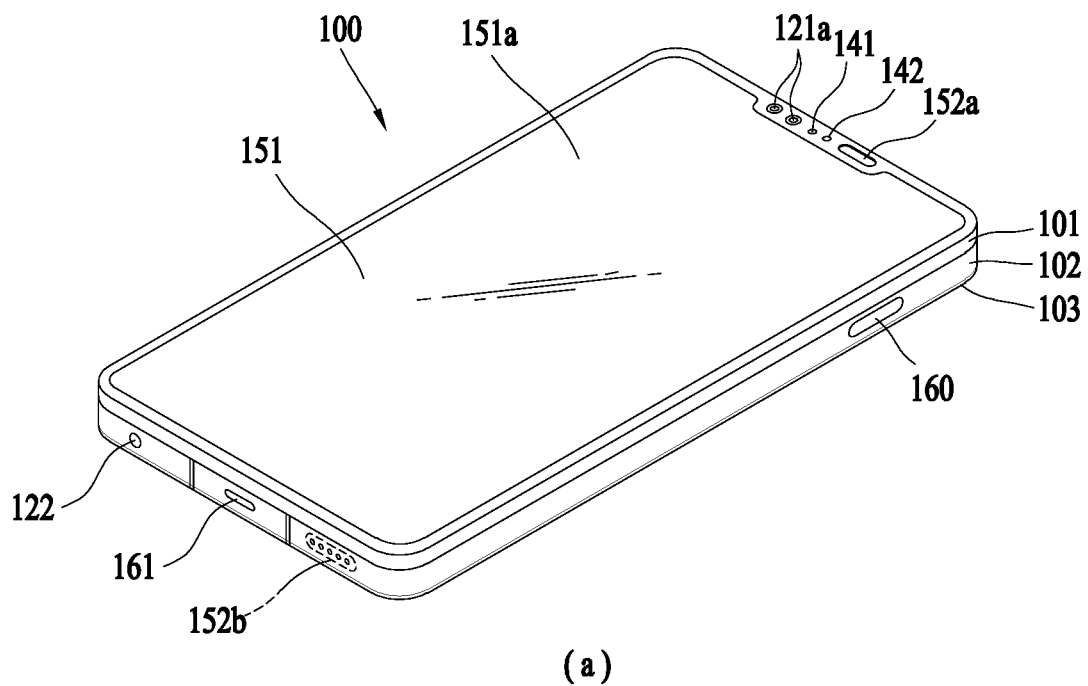
FIG. 4(a) is a front perspective view illustrating a mobile terminal related to the present disclosure and FIG. 4(b) is a rear front perspective view illustrating the mobile terminal.
Figure 4:
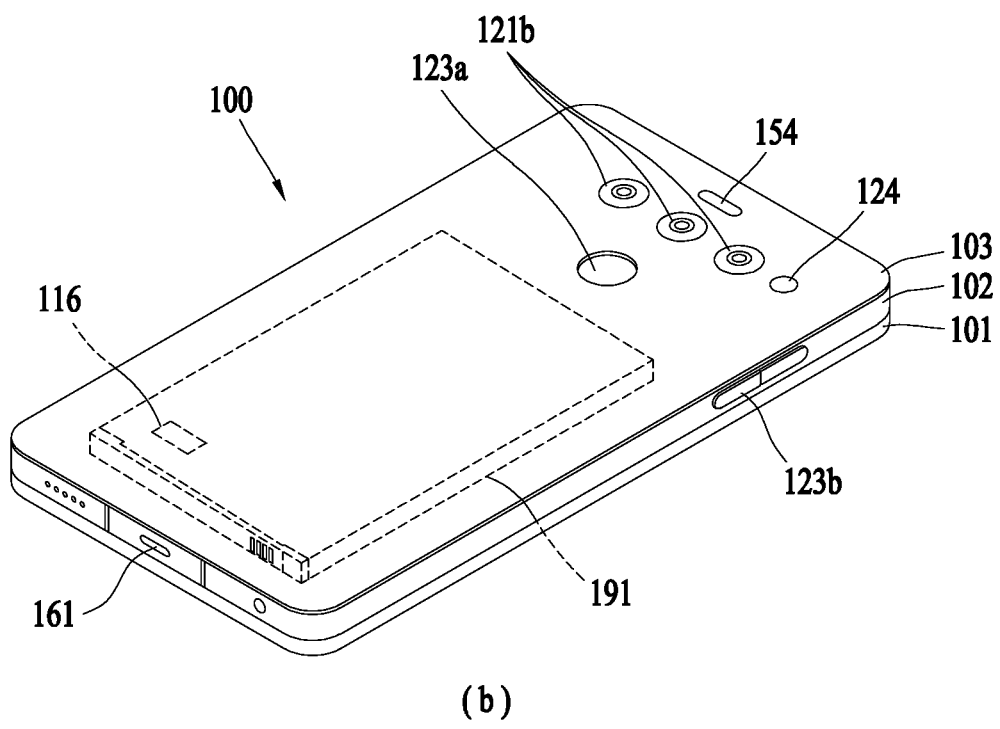

FIG. 4(*a*) is a front perspective view of the mobile terminal 100 according to the present disclosure, and FIG. 4(*b*) is a rear perspective view of the mobile terminal 100 according to the present disclosure.

The mobile terminal 100 according to the present disclosure may be implemented as a bar-type mobile terminal body, as shown in FIGS. 4(*a*) and 4(*b*). However, aspects of the present disclosure are not limited thereto, the mobile terminal 100 may be coupled to the auxiliary device 200, as described with reference to FIGS. 1 and 2. For example, a smart watch-type mobile terminal 100 may be applied to the present disclosure. In this case, the seating member 210 of the auxiliary device 200 may be coupled to a rear surface of the smart watch-type mobile terminal 100, and the cover member 260 may be rotatably hinged to the seating member 210 to selective cover the front side of the smart watch-type mobile terminal 100.

The mobile terminal 100 includes a case (for example, a frame, a housing, a cover, and the like) forming the appearance of the mobile terminal. As illustrated, the mobile terminal 100 may include a front case 101 and a rear case 102. Various electronic components are arranged in an inner space formed by coupling of the front case 101 and the rear case 102. At least one middle case may be additionally arranged between the front case 101 and the rear case 102.

The display 151 may be located on the front side of the mobile terminal body to output information. As illustrated, a window 151*a* of the display 151 may be mounted to the front case 101 to form the front surface of the mobile terminal body together with the front case 101.

In some embodiments, electronic components may also be mounted to the rear case 102. Examples of such electronic components include a detachable battery, an identification module, a memory card, and the like. In this case, a rear cover 103 may be detachably coupled to the rear case 102 to cover the electronic components mounted to the rear case. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. Meanwhile, the rear cover 103 may include an opening for externally exposing a camera 121*b*, an optical output part 154, a flash 124, a rear input part 123*a*, and the like.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating various electronic components, the mobile terminal 100 may be configured such that one case forms the inner space. In this example, a mobile terminal 100 having a uni-body is formed in such a manner that synthetic resin or metal extends from a side surface to a rear surface.

Meanwhile, the mobile terminal 100 may include a waterproofing part (not shown) for preventing introduction of water into the mobile terminal body. For example, the waterproofing part may include a waterproofing member which is located between the window 151*a* and the front case 101, between the front case 101 and the rear case 102, or between the rear case 102 and the rear cover 103, to hermetically seal an inner space when those cases are coupled.

The mobile terminal 100 may be provided with the display 151, the first audio output part 152a, the second audio output part 152b, the proximity sensor 141, the illumination sensor 142, the optical output part 154, the first camera 121a, the second camera 121b, the manipulating parts 123a and 123b, the microphone 122, the interface 160, and the like.

In the following, it is described by taking an example, as shown in FIGS. 4(a) and 4(b), that the display 151, the first audio output part 152a, the proximity sensor 141, the illumination sensor 142, and the first camera 121a are arranged at the front side of the mobile terminal body, that the manipulating part 123b, the second audio output part 152b, the microphone 122, and the interface 160 are arranged on a side surface of the mobile terminal body, and that the optical output part 154, the manipulating part 123a, the second camera 121b, and the flash 124 are arranged at a rear side of the mobile terminal body.

However, these components are not limited to the above-described arrangement. Such components may be excluded or replaced or arranged on a different surface, when necessary. For example, the manipulating part 123a may not be provided at the rear side of the mobile terminal body, and the second audio output part 152b may be provided not in the side surface of the mobile terminal body, but in the rear surface of the mobile terminal body.

The display 151 may display (output) information processed in the mobile terminal 100. For example, the display 151 may display execution screen information of an application program executing at the mobile terminal 100 or user interface (UI) and graphic user interface (GUI) information in response to the execution screen information.

The display 151 may include at least one of a liquid crystal display (LCD), a thin film transistor-liquid crystal display (TFT-LCD), an organic light emitting diode (OLED), a flexible display, a 3-dimensional (3D) display, or an e-ink display.

The display 151 may be implemented using two display devices, according to an implementing form of the mobile terminal 100. In this case, a plurality of the displays may be arranged on one surface, either spaced apart from each other, or these devices may be integrated, or these devices may be arranged on different surfaces.

In order to receive a control command in a touching manner, the display 151 may include a touch sensor for sensing a touch input received at the display 151. When a touch is input to the display 151, the touch sensor may sense the touch and the controller 180 may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display (not shown) at a rear side of the window 151a, or a metal wire which is patterned directly on the rear surface of the window 151a. Alternatively, the touch sensor may be integrally formed with the display. For example, the touch sensor may be disposed on a substrate of the display or within the display.

As such, the display 151 may also form a touch screen together with the touch sensor. In this case, the touch screen may serve as the user input part 123 (see FIG. 3). In some cases, the touch screen may replace at least some of the functions of the first manipulating part 123a.

The first audio output part 152a may be implemented in the form of a receiver that delivers voice audio to a user's ear, and the second audio output part 152b may be implemented in the form of a loud speaker that outputs various alarm sounds or multimedia audio reproduction.

An aperture for releasing audio generated by the first audio output part 152a may be formed in the window 151a of the display 151. However, aspects of the present disclosure are not limited thereto, and audio may be released along an assembly gap between structural bodies (for example, a gap between the window 151a and the front case 101). In this case, a hole independently formed to output audio sounds may not be seen or may be hidden in terms of appearance, thereby further simplifying the appearance of the mobile terminal 100.

The optical output part 154 is configured to output light for indicating occurrence of an event. Examples of such events include a message reception, a call signal reception, a missed call, an alarm, a schedule notice, an email reception, information reception through an application, and the like. When a user has checked a generated event, the controller 180 can control the optical output part 154 to stop outputting light.

The first camera 121a processes image frames such as still or moving images obtained by the image sensor in a capture mode or a video call mode. The processed image frames may be displayed on the display 151 and may be stored in the memory 170.

The first and second manipulating parts 123a and 123b are examples of the user input part 123 that is manipulated to receive a command for controlling operation of the mobile terminal 100. The first and second manipulating parts 123a and 123b may employ any tactile method that allows the user to perform manipulation such as touch, push, scroll, or the like. In addition, first and second manipulating parts 123a and 123b may employ any non-tactile method that allows the user to perform manipulation such as proximity touch, hovering, or the like.

The manipulating part 123a may be in the form of a mechanical key or a combination of a touch key and a mechanical key. In addition, the manipulating part 123a may be in the form layered with a finger scan sensor.

Input to be received by the first and second manipulating parts 123a and 123b may be set in various ways. For example, an input to a menu, a home key, cancellation, search, or the like may be input, and an input to control a volume level being output from the first or second audio output part 152a or 152b, to switch to a touch recognition mode of the display 151, or the like may be input.

As another example of the user input part 123, a rear input part (not shown) may be located at the rear side of the mobile terminal body. The rear input part is manipulated to receive an input for controlling operation of the mobile terminal 100. The input may be set in a variety of different ways. For example, the rear input part may receive an input for power on/off, start, end, scroll, control volume level being output from the first or second audio output part 152a or 152b, switch to a touch recognition mode of the display 151, and the like. The rear input part may be configured to allow a touch input, a push input, or combinations thereof.

The rear input part may be located to overlap the display 151 of the front side in a thickness direction of the mobile terminal body. As one example, the rear input part may be located on an upper end portion of the rear side of the mobile terminal body such that a user can easily manipulate it using a forefinger when the user grabs the mobile terminal body with one hand. However, aspects of the present disclosure are not limited thereto, and the position of the rear input part may change.

As such, when the rear input part is provided at the rear side of the mobile terminal body, a new type of user interface may be implemented using the rear input part. In addition, when the first manipulating part 123a is not located at the front side of the mobile terminal body since the aforementioned touch screen or the rear input part substitute for at least some functions of the first manipulating part 123a provided at the front side of the mobile terminal body, the display 151 may be in the form of a larger screen.

Meanwhile, the mobile terminal 100 may include a finger scan sensor for recognizing a user's fingerprint. The controller 180 may use fingerprint information sensed by the finger scan sensor as part of an authentication procedure. The finger scan sensor may be embedded in the display 151 in the user input part 123.

The microphone 122 is configured to receive a user's voice, other sound, and the like. The microphone 122 may be provided in plural to receive stereo sound.

The interface 160 serves as a path allowing the mobile terminal 100 to interface with an external device. For example, the interface 160 may include one or more of a connection mobile terminal for connecting to another device (for example, an earphone, an external speaker, or the like), a port for near field communication (for example, an Infrared Data Association (IrDA) port, a Bluetooth port, a wireless LAN port, and the like), or a charging port 161 for supplying power to the mobile terminal 100. The interface 160 may be implemented in the form of a socket for accommodating an external card, such as Subscriber Identification Module (SIM), User Identity Module (UIM), or a memory card for information storage.

The second camera 121b may be located at the rear side of the mobile terminal body. In this case, the second camera 121b may have an image capturing direction substantially opposite to that of the first camera 121a.

The second camera 121b may include a plurality of lenses arranged along at least one line. The plurality of lenses may also be arranged in a matrix configuration. Such cameras may be referred to as an "array camera." When the second camera 121b is implemented as an array camera, images may be captured in various manners using the plurality of lenses, and images with better qualities may be obtained.

The flash 124 may be located adjacent to the second camera 121b. When an image of a subject is captured with the camera 121b, the flash 124 may illuminate the subject.

The second audio output part 152b may be additionally arranged in the mobile terminal body. The second audio output part 152b may implement stereophonic sound functions in conjunction with the first audio output part 152a, and may be also used for implementing a speaker phone mode for call communication.

At least one antenna for wireless communication may be located on the mobile terminal body. The antenna may be installed in the mobile terminal body or formed by the case. For example, an antenna which configures a part of the broadcast receiver 111 (see FIG. 3) may be retractable into the mobile terminal body. Alternatively, an antenna may be in the form of a film attached to an inner surface of the rear cover 103 or in the form of a case including a conductive material.

A power supply 190 (see FIG. 3) for supplying power to the mobile terminal 100 may be provided at the mobile terminal body. The power supply 190 may include a battery 191 embedded in in the mobile terminal body or detachably coupled to an outside of the mobile terminal body.

The battery 191 may be configured to receive power via a power source cable connected to the interface 160. Also, the battery 191 may be configured to be recharged in a wireless manner using a wireless charger. Wireless charging may be implemented by magnetic induction (electromagnetic resonance).

Meanwhile, in the drawing, the rear cover 103 is coupled to the rear case 102 for shielding the battery 191, to prevent separation of the battery 191, and to protect the battery 191 from an external impact or from foreign material. When the battery 191 is detachable from the mobile terminal body, the rear case 103 may be detachably coupled to the rear case 102.

Figure 5:
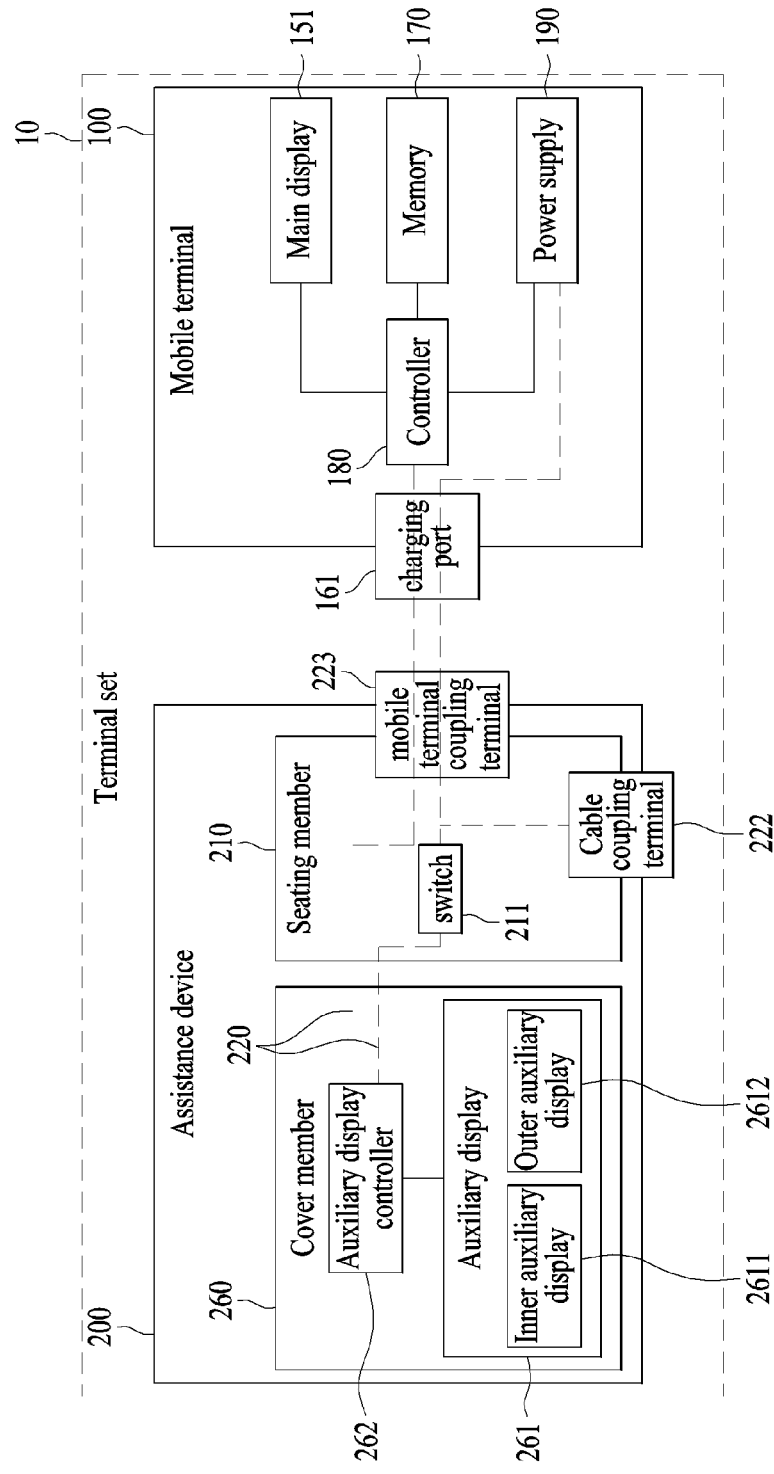
FIG. 5 is a block diagram illustrating a terminal set related to the present disclosure.

FIG. 5 is a block diagram illustrating a terminal set 10 according to the present disclosure.

As described above, the terminal set 10 according to the present disclosure may be divided into a mobile terminal 100 and an auxiliary device 200. The auxiliary device 200 includes a seating member 210 and a cover member 260. A main display 151 is provided at the mobile terminal 100, and an auxiliary display 261 is provided at the cover member 260.

A controller 180 may be provided at the mobile terminal 100 and control operation of the main display 151 and the auxiliary display 261. That is, as described with reference to FIG. 3, the controller 180 may control overall operation of the mobile terminal 100 and may further control operation regarding outputting of the auxiliary display 261. The controller 180 may include a physical form of an application processor (AP) or a system-on-chip (SOC).

A memory 170 provided at the mobile terminal 100 may be used for operation of the main display 151 and even for operation of the auxiliary display 261. For example, a game application stored in the memory 170 of the mobile terminal 100 may be executed by signal processing and computation of the controller 180, and data for outputting a screen may be output on the main display 151 or may be transmitted to the auxiliary device 200 to be output on the auxiliary display 261.

A power supply 190 of the mobile terminal 100 may supply power not just for operation of an internal configuration of the mobile terminal 100, but also for operation of the auxiliary device 200. The auxiliary device 200 may include a switch 211 to optionally supply the power. The switch 211 may be disposed on a side of the seating member 210.

The auxiliary display 261 may be driven dependent on an application processor (AP), the memory 170, and the power supply 190 of the mobile terminal 100. For example, a small-sized power supply, a volatile memory that temporarily stores data, and the like may be provided as necessary to assist an operation control. In particular, an auxiliary display controller 262 for controlling outputting of the auxiliary display 261 may be provided at the cover member 260. The auxiliary display controller 262 may convert data transmitted from the mobile terminal 100 and output the converted data to the auxiliary display 261 or may perform other auxiliary operation necessary for outputting of the auxiliary display 261. Further, the auxiliary device 200 may be provided with a touch panel corresponding to the auxiliary display 261 and may generate, process, and transmit an input signal through the touch panel.

Further, as a magnet for sensing coupling and a hall sensor may be provided at the auxiliary device 200 and the mobile terminal 100, a user interface for starting linking to the auxiliary display 261 may be output on the main display 151 and power supply to the auxiliary display 261 may start.

The auxiliary device 200 and the mobile terminal 100 are electrically connected with each other to supply power and transmit and receive data. More specifically, the auxiliary display 261 of the cover member 260 may be electrically connected all the way with the mobile terminal 100 to transmit and receive power and data. The seating member 210 electrically links the cover member 260 and the mobile terminal 100 at a position between the two members. The seating member 210 may include a mobile terminal coupling terminal 223 to be coupled to a charging port 161 of the mobile terminal 100. When coupled to the auxiliary device 200, the mobile terminal 100 may transmit and receive power or data from an outside through a cable coupling terminal 222 exposed at an outer side of the auxiliary device 200.

A circuit configuration provided on the auxiliary device 200 to drive the auxiliary display 261 may be defined as an auxiliary circuit 220.

Referring back to FIGS. 1 and 2, the seating member 210 forms a seating area 2101 in which a rear surface of the mobile terminal 100 sits. The seating member 210 forms an open area so that an output area of the display of the mobile terminal 100, that is, the main display 151, may be visible on the front side when the mobile terminal 100 sits in the seating member 210. At the same time, at least one area of the rear surface of the seating member 210 has an opening 2102 so as to expose a camera of the mobile terminal 100 and the like. A side circumference 2103 of the seating member 210 may be formed to correspond to a side circumferential shape of the mobile terminal 100 so as to enable the mobile terminal 100 to be coupled to the seating member 210 in a fit manner.

When coupled to the seating member 210, the cover member 260 forms at least one rotation axis at one edge of the seating member 210 to selectively cover the seating area 2101.

The cover member 260 provides the auxiliary display 261. A display panel of the auxiliary display 261 may be disposed on one surface of the cover member 260 to form an output area. The display panel may be provided with a touch panel to receive an external touch input.

A hinge module 400 connects the seating member 210 and the cover member 260 to provide at least one rotation axis such that the cover member 260 rotates about the seating member 210. The cover member 260 rotated due to the hinge module 400 selectively covers the seating area 2101 of the seating member 210.

Figure 6:
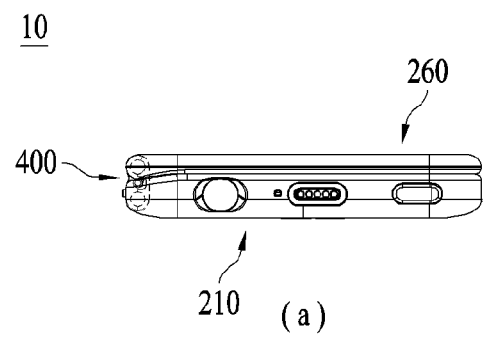
FIG. 6 illustrates a cover member changed sequentially from a fully closed state to a fully opened state in a terminal set.
Figure 6:
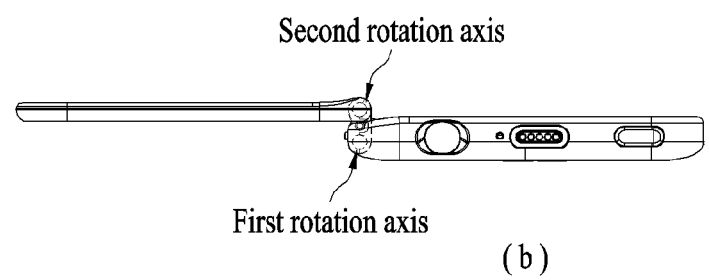
Figure 6:
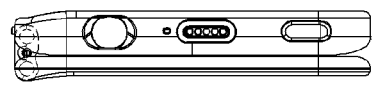

FIG. 6 illustrates the terminal set 10 in which the cover member 260 is changed from a fully closed state to a fully opened state in sequence.

The cover member 260 is rotated by the hinge module 400 to open and close a main display of the mobile terminal 100 sit in the seating member 210.

When the cover member 260 opened or closed 360° using a single rotation axis is to be implemented, a significantly large sized hinge structure may be required or the auxiliary device 200 may have a limited shape. Thus, it is desirable that the hinge module 400 has two rotation axes or more to 360° open and close the cover member 260 within a range to which a size of the hinge module 400 increases acceptably.

The hinge module 400 provides a first rotation axis formed on a side of the seating member 210 and a second rotation axis formed on a side of the cover member 260. The first rotation axis forms a relative rotation between the hinge module 400 and the seating member 210, and the second rotation axis forms a relative rotation between the hinge module 400 and the cover member 260.

A process of opening the cover member 260 can be described in sequence as follows. The cover member 260 rotates about the second rotation axis relative to the hinge module 400 (FIG. 6(a)→FIG. 6(b)). Thereafter, the cover member 260 and the hinge module 400 rotate about the second rotation axis relative to the seating member 210 (FIG. 6(b)→FIG. 6(c)).

Figure 7:
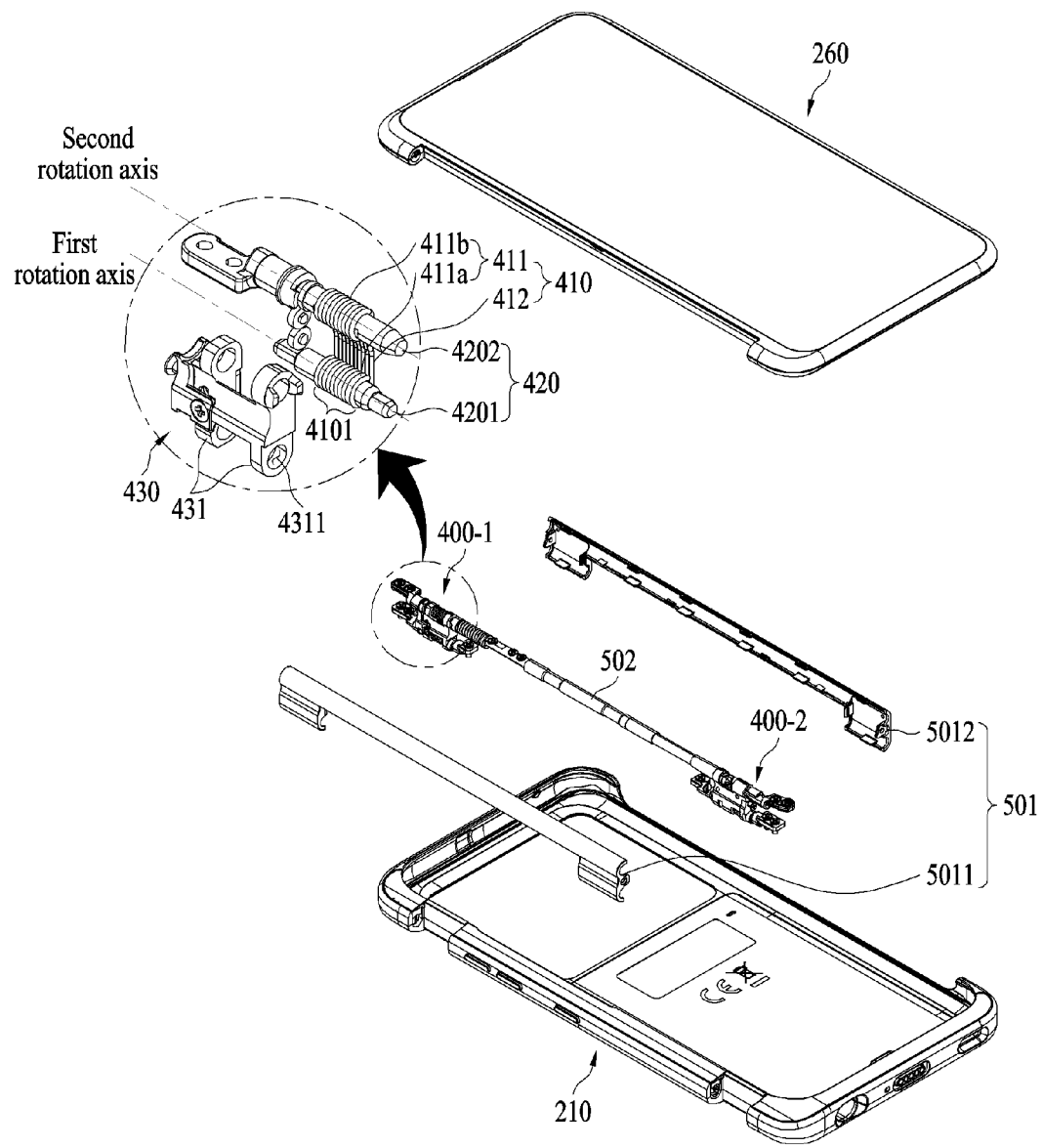
FIGS. 7 and 8 illustrate uncoupled and coupled states of a hinge module related to the present disclosure.
Figure 8:
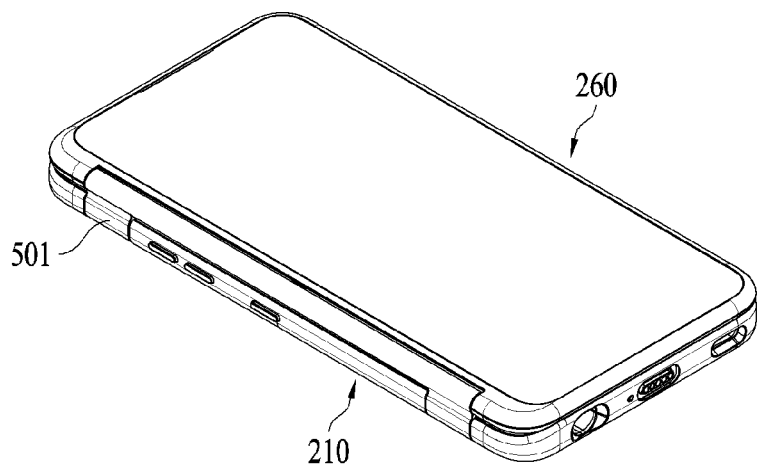

FIGS. 7 and 8 illustrate uncoupled and coupled states of the hinge module 400 related to the present disclosure.

The hinge module 400 includes a rotation member 420 and a holder 430. The rotation member 420 may be fixed to each of the seating member 210 and the cover member 260 to move along with the seating member 210 or the cover member 260. Each rotation member may be screwed and fixed to the corresponding member. The holder 430 may rotate relative to the rotation member 420. In the following description, a rotation of the hinge module 400 refers to a relative rotation between the cover member 260 and the hinge module 400, or a relative rotation between the seating member 210 and the hinge module 400.

The rotation member 420 provides a rotation axis through a first rotation member 4201. The seating member 210 and the hinge module 400 relatively rotate based on the first rotation axis. The rotation member 420 provides a second rotation axis through a second rotation member 4202. The cover member 260 and the hinge module 400 relatively rotate based on the second rotation axis.

The first rotation member 4201 and the second rotation member 4202 may be arranged in parallel. The first rotation member 4201 and the second rotation member 4202 form different rotation axes and have similar or identical characteristics. Thus, the description related to the characteristic of the rotation member 420 is applicable to the first rotation member 4201 and the second rotation member 4202.

The hinge module 400 forms a free-stop hinge to fix an angle between the cover member 260 and the seating member 210 within a range to which at most a predetermined magnitude of force is applied when the cover member 260 is opened with respect to the seating member 210. For example, when the cover member 260 is opened 120° with respect to the seating member 210, a torque generated due to a weight of the cover member 260 or an external force is restrained by an elastic member 410. As such, the predetermined magnitude of force applied to the cover member 260 may be restrained to prevent the rotation of the cover member 260.

The elastic member 410 generates a frictional force to restrain the rotation of the rotation member 420 by pressing the first rotation member 4201 and the second rotation member 4202 simultaneously or pressing one of the first rotation member 4201 and the second rotation member 4202. The elastic member 410 may include a metal material and thus, maintain an elastic force without being damaged in an elastically deformable range.

More specifically, the elastic member 410 elastically presses the rotation member 420 using a pressing portion 411 having a shape of a ring that covers at least a portion of a circumferential surface of the rotation member 420. The ring-shaped pressing portion 411 may be cut or opened at one point so as to be expanded based on a size and a shape of the circumferential surface of the rotation member 420.

The pressing portion 411 includes a first pressing portion 411a that presses the first rotation member 4201 and a second pressing portion 411b that presses the second rotation member 4202. As described later, in the hinge module 400 of another example embodiment, the pressing portion 411 may be implemented to press one of the first rotation member 4201 and the second rotation member 4202.

The first pressing portion 411a and the second pressing portion 411b are connected by a fixing portion 412. The fixing portion 412 prevent the pressing portion 411 from rotating by a rotation torque transmitted from the rotation member 420. More specifically, since the first pressing portion 411a and the second pressing portion 411b are connected by the fixing portion 412, the elastic member 410 may not rotate even if the rotation torque is applied to the first pressing portion 411a or the second pressing portion 411b.

Since the elastic member 410 is in a form of annularly covering and pressing the rotation member 420, the rotation member 420 is pressed in a direction vertical to a rotation axis instead of in a rotation axis direction. Thus, the elastic member 410 may be efficiently implemented without occupying an additional space in a longitudinal direction of one edge.

The elastic member 410 may be provided in a form of a plurality of unit wires 4101 stacked in a first rotation axis direction. The unit wire 4101 may be a unit in which a wire is wound and fixed around the rotation member 420 once on a plane vertical to and the first rotation axis. In the above-described example embodiment, the unit wire 4101 of the hinge module 400 may include the first pressing portion 411a, the second pressing portion 411b, and the fixing portion 412. The unit wire 4101 may be formed as a single member.

When the elastic member 410 is provided in a form of wire, the elastic member 410 may be manufactured through a bending process and the like, thereby achieving easiness of manufacturing. Also, the elastic member 410 may have a relatively low possibility of damage due to a stress occurring at a boundary point and the like. The wire may be implemented to have a circular cross section, a polygonal cross section, or the like.

In the elastic member 410, as a number of the stacked unit wires 4101 increases, a torque restraining force of the rotation member 420 increases. Also, the torque restraining force of the rotation member 420 may be controlled based on an outside diameter of the rotation member 420 and an inside diameter of the pressing portion 411. Considering this, a stacking count and a size of the unit wire 4101 of the elastic member 410 may be adjusted.

The plurality of stacked unit wires 4101 may be provided separate from one another. The plurality of stacked unit wires 4101 may be pressed by support plates 431 of the holder 430 from both sides in the first rotation axis direction. Simultaneously, the support plates 431 may form axial coupling holes through which the rotation member 420 passes. The support plates 431 pressing both sides of the elastic member 410 functions to hold the elastic member 410 not to deviate outwardly.

Figure 9:
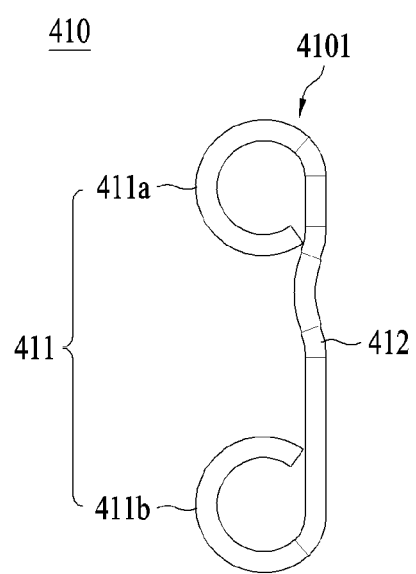
FIG. 9 is a front view illustrating one unit wire of an elastic member related to the present disclosure and FIG. 10 illustrates the elastic member and a rotation member.
Figure 10:
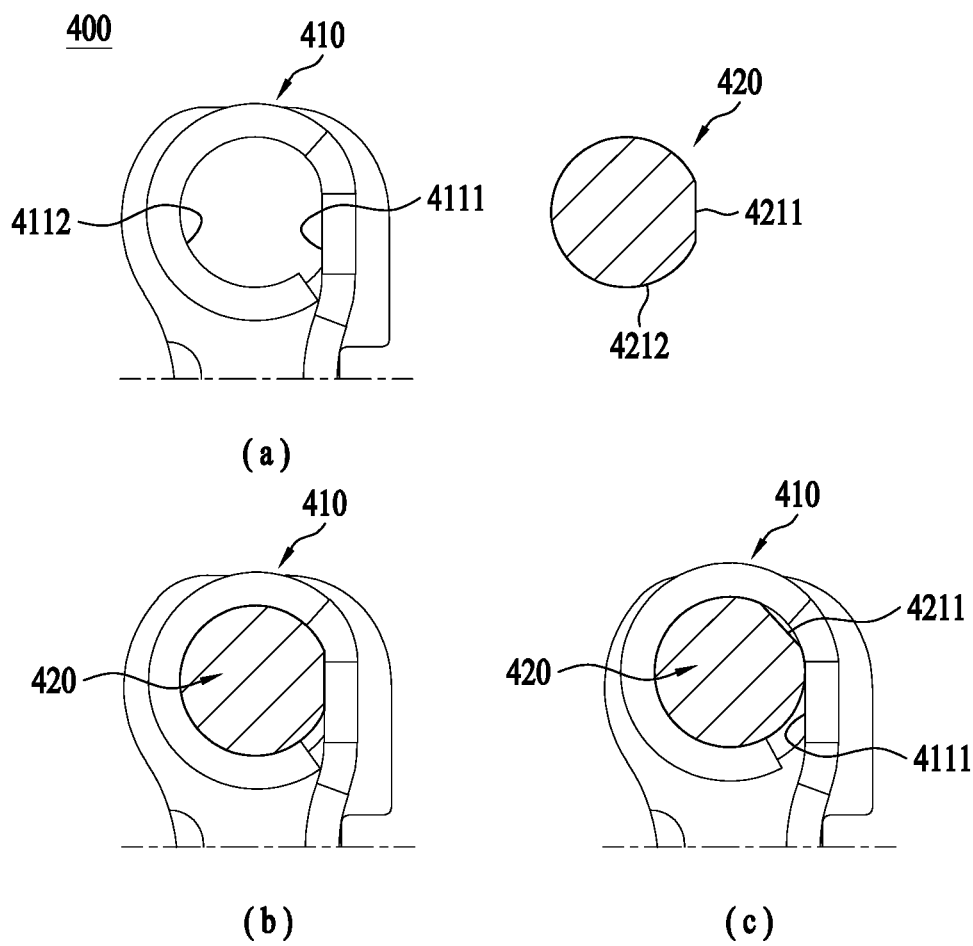
Figure 11:
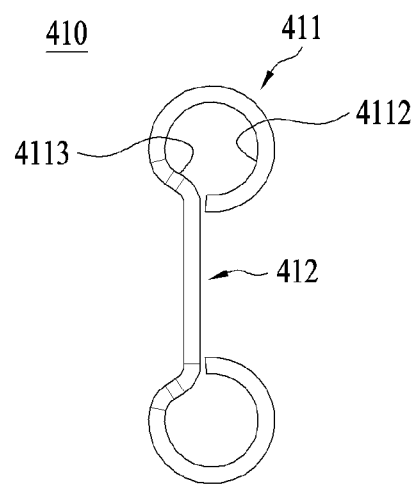
FIGS. 11 through 15 are front views illustrating example embodiments of an elastic member related to the present disclosure.
Figure 12:
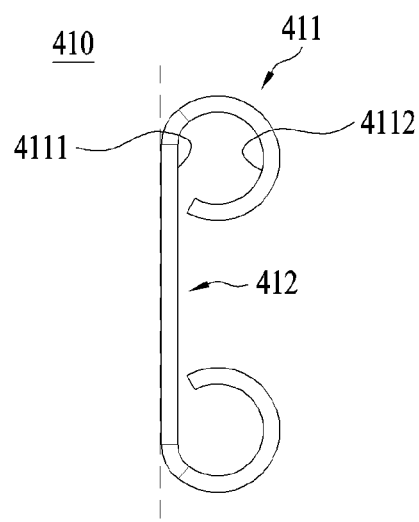

FIG. 9 is a front perspective view illustrating one unit wire 4101 of the elastic member 410 related to the present disclosure and FIG. 10 illustrates examples of the elastic member 410 and the rotation member 420. FIG. 10(a) illustrates a state in which the elastic member 410 is uncoupled from the rotation member 420, FIG. 10(b) illustrates a state in which the elastic member 410 of FIG. 10(a) is coupled with the rotation member 420, and FIG. 10(c) illustrates a state in which the rotation member 420 is rotated with respect to the elastic member 410 at a predetermined angle based on the example of FIG. 10(b).

In the present disclosure, the hinge module 400 may implement a click hinge structure. Once the click hinge structure is implemented, the seating member 210 and the cover member 260 may be guided and fixed at a preset angle when the seating member 210 and the cover member 260 forms an angle approximate to the preset angle. For example, the click hinge structure is implemented at a position in which an angle between the seating member 210 and the cover member 260 is 120°. In this example, when the seating member 210 and the cover member 260 forms an angle ranging between 1150 and 125°, the angle between the seating member 210 and the cover member 260 may be automatically fixed to 120°.

To implement the click hinge structure, the rotation member 420 and the fixing portion 412 may each have a noncircular cross-section. The noncircular cross-section refers to a cross section shaped not to have an equal radius in the entire area of the cross section.

For example, the rotation member 420 may have a circular cross-section having a cut-out area. An outer circumference corresponding to the cut-out area is defined as a recessed outer circumference 4211 and an outer circumference corresponding to a remaining area is defined as a circular outer circumference 4212. The pressing portion 411 of the elastic member 410 may have a recessed inner circumference 4111 corresponding to the recessed outer circumference 4211 and a circular inner circumference 4112 corresponding to the circular outer circumference 4212.

The cut-out area may include a straight boundary connecting disconnected two points on the circular outer circumference 4212.

A stable state may be realized when the recessed outer circumference 4211 of the rotation member 420 and the recessed inner circumference 4111 of the fixing portion 412 have the same width and located at corresponding angles. For example, as illustrated in FIG. 10(c), when the recessed outer circumference 4211 deviates from the recessed inner circumference 4111 in response to when the rotation member 420 rotating relative to the elastic member 410, a force to return to a stable state of FIG. 10(b) may be generated. Thus, unless an additional external force is applied in a state of FIG. 10(c), the state may be lead to the stable state of FIG. 10(b).

A condition for automatically returning to the state of FIG. 10(b) is that the recessed outer circumference 4211 is not totally deviated from the recessed inner circumference 4111. When the cut-out area is totally deviated from a recessed area, the force to return to the state of FIG. 10(b) is not generated. In this case, a function of a free-stop hinge may be performed, so that the cut-out area may be fixed at the corresponding angle.

The cut-out area may be provided in plural to implement a stepped click hinge for stopping a rotation of the rotation member 420 at various angles. When the rotation member 420 has two recessed outer circumferences 4211, and when a counterpart recessed outer circumference 4211 approaches an initial recessed inner circumference 4111 to be within a boundary, the rotation member 420 may be guided and fixed at another angle (not shown).

FIGS. 11 through 15 illustrate front views of the elastic member 410 according to example embodiments of the present disclosure.

In addition to the examples of FIG. 10, the rotation member 420 and the fixing portion 412 may be provided in corresponding shapes in various ways. For example, the pressing portion 411 may have a recessed inner circumference 4113 protruding inwardly and the circular inner circumference 4112 (see FIG. 11). Also, the elastic member 410 may be shaped so that the fixing portion 412 is located on the same line as one of left and right boundaries of the pressing portion 411 (see FIG. 12) while the pressing portion 411 has the recessed inner circumference 4111 and the circular inner circumference 4112 as illustrated in FIG. 10. When the elastic member 410 is formed through a bending process, in the case of FIG. 12, the bending process may be omitted in manufacturing and a structure in which the fixing portion 412 is easily supported by a counterpart may be achieved.

Figure 13:
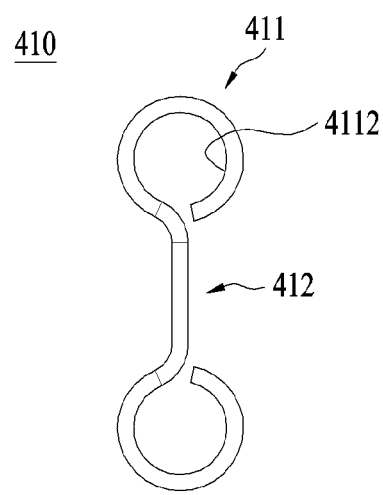

The elastic member 410 may have the pressing portion 411 including the circular inner circumference 4112 instead of a cut-out area such that a click hinge function is not implemented (see FIG. 13).

Figure 14:
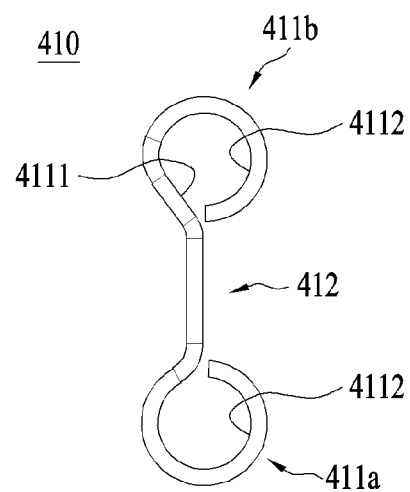

One of the first pressing portion 411a and the second pressing portion 411b may be implemented to have a cut-out area (see FIG. 14). For example, when the first pressing portion 411a has the circular inner circumference 4112, and when the second pressing portion 411b has the circular inner circumference 4112 and the recessed inner circumference 4111, the click hinge structure may be implemented only when the cover member 260 (see FIG. 7) rotates relative to the second rotation axis due to shapes of the second pressing portion 411b and the second rotation member 4202 (see FIG. 7) corresponding thereto.

Figure 15:
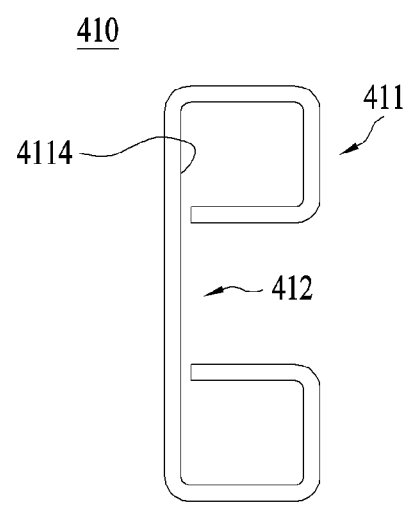

Four cut-out areas may be located adjacent to one another such that the pressing portion 411 forms a quadrangular inner perimeter 4114 (see FIG. 15). In this case, a bending process of the elastic member 410 may be performed easily and accurately. Also, a click hinge for fixing at a clearly distinguished angle may be implemented.

Figure 16:
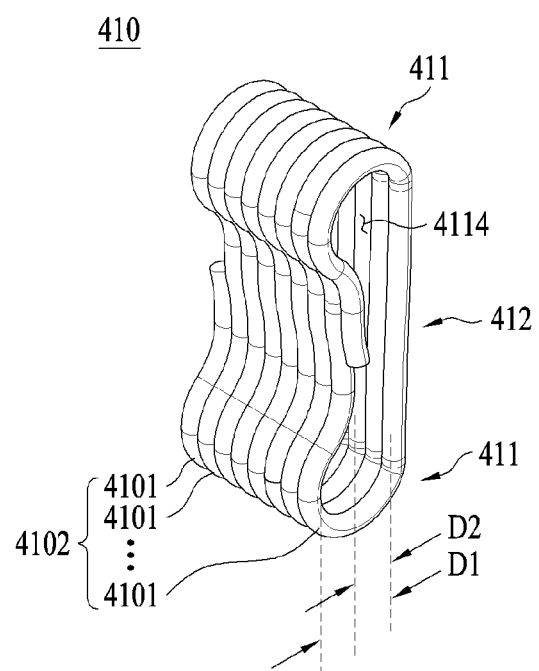
FIG. 16 illustrates another example embodiment of an elastic member related to the present disclosure.

FIG. 16 illustrates another example embodiment of the elastic member 410 related to the present disclosure.

In the examples of FIGS. 9 through 15, the unit wire 4101 is provided in a form stacked in plural. In contrast, FIG. 16 illustrates a single wire 4102 formed by connecting neighboring unit wires 4101 to be wound a plurality of times.

The elastic member 410 in a form of the single wire 4102 wound the plurality of times may form a closed loop having an opening 4114. The elastic member 410 of the closed loop may include the pressing portion 411 of which both ends correspond to the rotation member 420, and the fixing portion 412 connecting the pressing portions 411 at both sides. A distance D2 between the fixing portions 412 may be less than a distance D1 between outer boundaries of the pressing portion 411.

Figure 17:
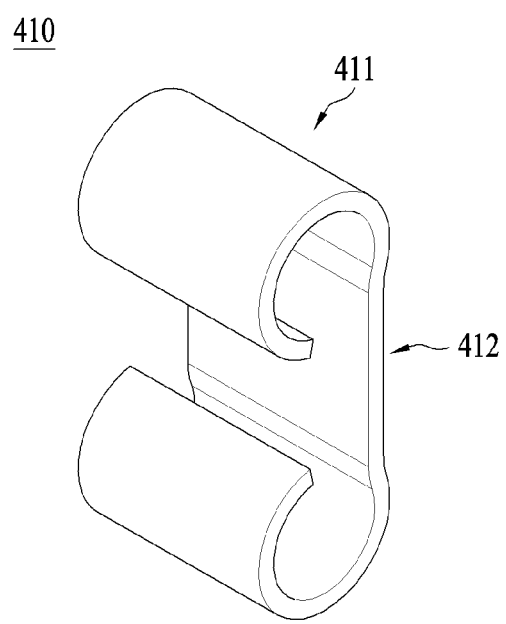
FIG. 17 illustrates another example embodiment of an elastic member related to the present disclosure.

FIG. 17 illustrates another example embodiment of the elastic member 410 related to the present disclosure.

The elastic member 410 may be implemented in a curved plate shape. The curved plate-shaped elastic member 410 is easy to be processed and advantageous in manufacturing costs.

In terms of the wire-shaped elastic member 410 of FIGS. 9 through 15, a degree of freedom of deformation for each unit wire 4101 may be higher than that of the curved plate-shaped elastic member 410. Thus, in the curved plate-shaped elastic member 410, each of the unit wires 4101 may be in close contact with the rotation member 420 such that a friction efficiently occurs therebetween. Also, the curved plate-shaped elastic member 410 may efficiently emit heat generated therein, without need to use a cooling oil.

Figure 18:
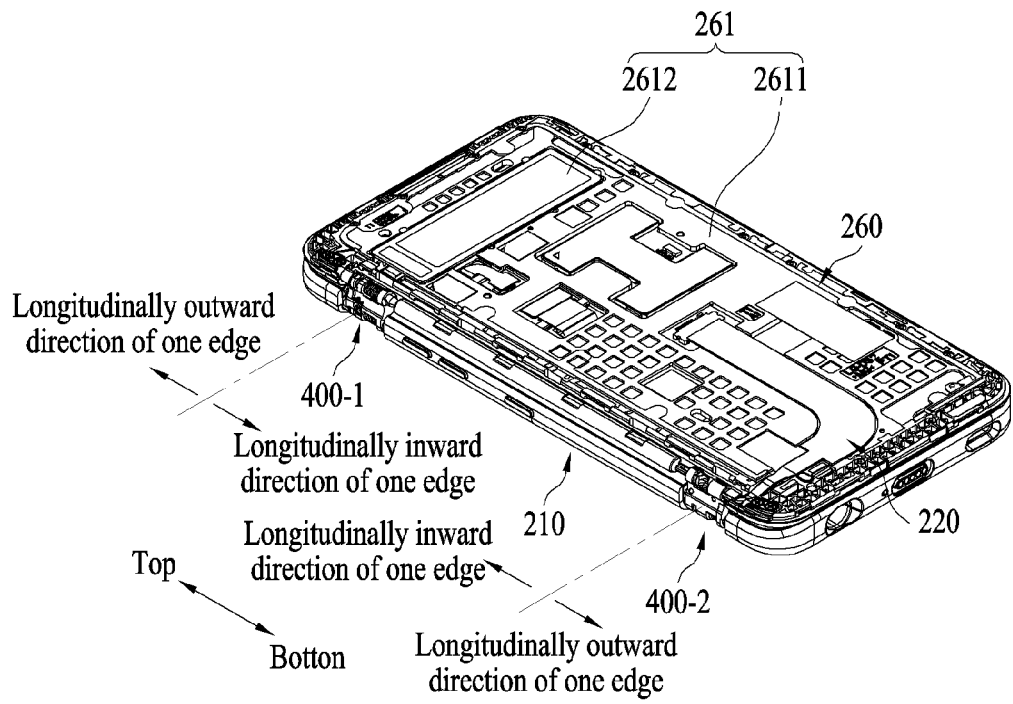
FIG. 18 illustrates an example of an auxiliary circuit and a hinge module of an auxiliary device from which a hinge cover and an upper cover of a cover member are removed.
Figure 19:
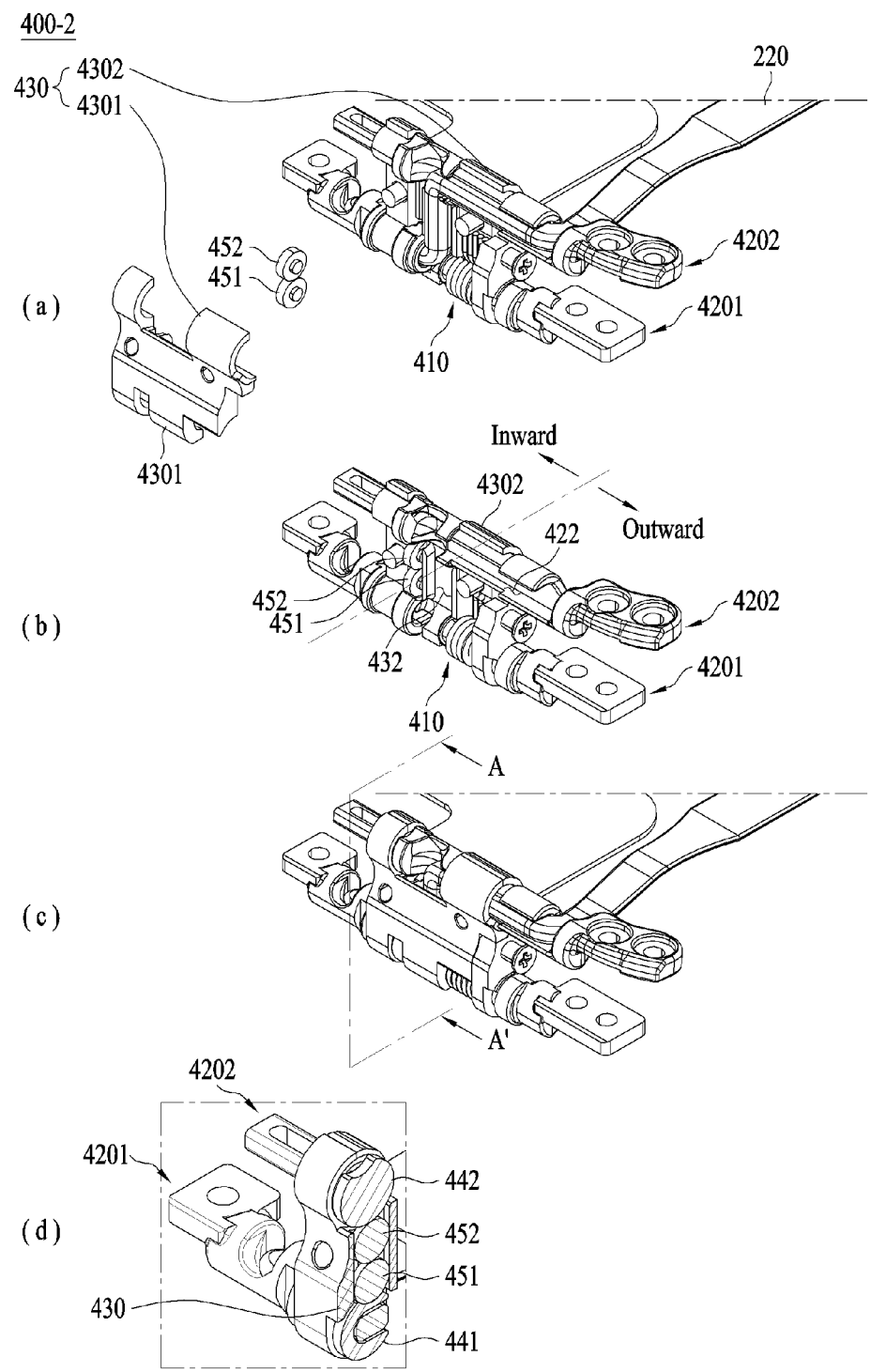
FIG. 19 illustrates perspective views of a lower hinge module in uncoupled and coupled states according to the present disclosure.

FIG. 18 illustrates an example of the auxiliary circuit 220 and the hinge module 400 of the auxiliary device 200 from which a hinge cover and an upper cover of the cover member 260 are removed. FIG. 19 illustrates perspective views of a lower hinge module 400-2 in uncoupled and coupled states according to the present disclosure. FIG. 19(a) is a partial exploded perspective view of the lower hinge module 400-2, FIG. 19(b) is a partial perspective view of the lower hinge module 400-2 from which an outer holder 4301 and the auxiliary circuit 220 are removed, FIG. 19(c) is a coupling perspective view of the lower hinge module 400-2, and FIG. 19(d) is a cross-sectional view taken along a line A-A' of FIG. 19(c). A reference will be made along with FIG. 5 for each of understanding.

Referring to FIG. 18, the hinge module 400 may be provided in plural along one edge of the auxiliary device 200 to open and close the cover member 260 without being twisted. Based on the auxiliary device 200, a hinge module 400 located in an upper portion of the one edge is defined as an upper hinge module 400-1 and a hinge module 400 located in a lower portion of the one edge is defined as the lower hinge module 400-2.

The auxiliary circuit 220 may electrically connect the auxiliary display 261 of the auxiliary device 200 and a mobile terminal coupled with the auxiliary device 200. The auxiliary circuit 220 may transfer power or data from the mobile terminal to the auxiliary display 261. The auxiliary circuit 220 may be partially exposed at one point of the seating member 210 so as to be connected to the mobile terminal 100. One side of the auxiliary circuit 220 may be connected to the auxiliary display 261 included in the cover member 260. Another side of the auxiliary circuit 220 may be exposed to the seating member 210. The auxiliary circuit 220 of the seating member 210 may be connected to the auxiliary circuit 220 of the cover member 260 via the hinge module 400.

Since the auxiliary circuit 220 connects the cover member 260 and the seating member 210 via the hinge module 400, a separate structure for external exposure or passing is not required and a possibility of damage is reduced.

The auxiliary circuit 220 may be disposed to pass through the lower hinge module 400-2 between the two hinge modules 400 of the auxiliary device 200. The mobile terminal 100 and the auxiliary device 200 are coupled via the coupling terminal 223 (see FIG. 20) of the seating member 210. The coupling terminal 223 is protrudingly formed at a position corresponding to the charging port 161 (see FIG. 4) provided at a bottom of the mobile terminal 100. As such, the auxiliary circuit 220 may be disposed to pass through the lower hinge module 400-2 so as to have a minimal shape and occupy a minimal space. Hereinafter, description will be made based on a case in which the auxiliary circuit 220 is connected via the lower hinge module 400-2. However, as would be apparent to one skilled in the art, the auxiliary circuit 220 may be configured to pass through the upper hinge module 400-1.

Referring to FIG. 19, the rotation member 420 of the lower hinge module 400-2 may have a seating hole 422 such that a portion of the auxiliary circuit 220 is sit therein. A portion of the seating hole 422 may form a recessed area on an inner side such that one area of an outer circumference of the rotation member 420 is opened. For example, the rotation member 420 may have a shape of a cylinder having a C-shaped cross section.

The auxiliary circuit 220 may pass through the seating hole 422 of each of the first rotation member 4201 and the second rotation member 4202 of the lower hinge module 400-2. A guide hole 432 may be formed between the seating hole 422 of the first rotation member 4201 and the seating hole 422 of the second rotation member 4202 to provide a path for passing the auxiliary circuit 220. The guide hole 432 may be formed in an inner surface of the holder 430.

A longitudinal direction of the seating hole 422 may be in parallel with a rotation axis, and a longitudinal direction of the guide hole 432 may be vertical to the rotation axis. Thus, a boundary at which the seating hole 422 meets the guide hole 432 may be bent vertically. The auxiliary circuit 220 may form a curved area corresponding to the bent area.

Based on the guide hole 432, the seating hole 422 of the first rotation member 4201 and the seating hole 422 of the second rotation member 4202 may be provided on opposite sides. The seating hole 422 of the first rotation member 4201 may be formed inwardly on one edge based on the guide hole 432. The seating hole 422 of the second rotation member 4202 may be formed outwardly on the one edge based on the guide hole 432. As described above, this is to minimize a space for the auxiliary circuit 220 and minimize a curve degree of the auxiliary circuit 220. As a result, the auxiliary circuit 220 may be provided in a stepped shape throughout the seating member 210 and the cover member 260.

Although not shown, the guide hole 432 may slantly connect the seating hole 422 of the first rotation member 4201 and the seating hole 422 of the second rotation member 4202, thereby minimizing a curved degree of the auxiliary circuit 220.

Due to the stepped shape of the auxiliary circuit 220, the lower hinge module 400-2 having the guide hole 432 may include the elastic member 410 having a less number of stacked unit wires 4101 when compared to the upper hinge module 400-1 not having the guide hole 432. This is because a space for stacking of the elastic member 410 is limited due to the auxiliary circuit 220 passing through the guide hole 432.

Further, the elastic member 410 may include the pressing portion 411 that presses one of the first rotation member 4201 and the second rotation member 4202. Thus, unlike a side of the upper hinge module 400-1 in which a torque applied to the pressing portion 411 on one side is suppressed from being rotated by the pressing portion 411 on the other side, the pressing portion 411 provided at only one side of the lower hinge module 400-2 may be suppressed from being rotated when the connected fixing portion 412 is supported by another member. In this example, the fixing portion 412 may be supported by the holder 430. A shape of the pressing portion 411 is not limited to a form of the elastic member 410 of FIG. 19, and may also be implemented in a half form of the form described with reference to FIGS. 9 through 17.

Due to the elastic member 410 on a side of the lower hinge module 400-2 pressing only the first rotation member 4201, a free-stop structure in which the upper hinge module 400-1 and the lower hinge module 400-2 are asymmetric on the second rotation member 4202.

To solve the issues, the second rotation member 4202 of the lower hinge module 400-2 not having the pressing portion 411 of the elastic member 410 may be connected to the second rotation member 4202 of the upper hinge module 400-1 through a torque transmitting member 502. Accordingly, even if the second rotation member 4202 of the lower hinge module 400-2 rotates with respect to the holder 430 (or the hinge module 400), a rotation suppressing force may be generated on both sides of the upper hinge module 400-1 and the lower hinge module 400-2 since the first rotation member 4201 of the upper hinge module 400-1 has the rotation suppressing force by the elastic member 410.

Also, the upper hinge module 400-1 forms a rotation axis in the upper portion and the lower hinge module 400-2 forms a rotation axis in the lower portion. However, when an ununiformed force for opening and closing is transmitted from outside, a phenomenon such as twisting may occur. In a short view, this may cause issues that a user feels uncomfortable in opening and closing, or the opening and closing is unavailable. Also, a stress due to an unbalanced twisting between the hinge modules 400 may be occurred. The torque transmitting member 502 may minimize a possibility of the issue occurring.

As the foregoing, when the seating hole 422 is formed inwardly in a longitudinal direction of the one edge of the first rotation member 4201 of the lower hinge module 400-2 and the seating hole 422 is formed outwardly in a longitudinal direction of the one edge of the second rotation member 4202, a device may be implemented without interfering with the auxiliary circuit 220 even if the torque transmitting member 502 connects the second rotation members 4202 of the upper hinge module 400-1 and the lower hinge module 400-2.

The torque transmitting member 502 may include a non-conductive material such as polycarbonate to secure a wireless performance of an antenna included in the mobile terminal 100 or the auxiliary device 200.

Referring to FIG. 19(d), the hinge module 400 may include a cam and roller support structure for implementing sequential opening and closing of the cover member 260. The seating member 210 and the hinge module 400 may mutually rotate with respect to the first rotation axis. The cover member 260 and the hinge module 400 may mutually rotate with respect to the second rotation axis. When the cover member 260 is opened in a state in which the seating member 210 is fully closed by the cover member 260, it is desirable that the hinge module 400 does not rotate along with the seating member 210. This is to maintain a state in which the auxiliary display 261 of the cover member 260 is adjacent to the main display of the mobile terminal 100 in a process of opening the cover member 260.

To implement such rotation structure, a cam and roller structure may be applied to the hinge module 400. The first rotation member 4201 and the holder 430 may include a first cam 441 and a first roller 451, respectively. The second rotation member 4202 and the holder 430 may include a second cam 442 and a second roller 452, respectively. To reduce a size of the hinge module 400, a roller may be included in the holder 430, the first rotation member 4201 may form the first cam 441, and the second rotation member 4202 may form the second cam 442. Also, the first roller 451 and the second roller 452 may be smaller in diameter than the first cam 441 and the second cam 442.

When the cover member 260 is opened from a state in which fully closing the seating member 210, the first roller 451 may be sit in a recessed area of the first cam 441 and prevent the hinge module 400 from rotating even if a rotation torque is applied to the hinge module 400. Thus, the second rotation member 4202 forming the second cam 442 rotates first. When the second rotation member 4202 rotates and reaches at a predetermined angle (for example, 180°), the second roller 452 may be sit in a recessed area of the second cam 442 so that the second rotation member 4202 and the holder 430 rotate together. Thereafter, the first roller 451 may come out from the recessed area of the first cam 441, so that the hinge module 400 (or the holder 430) rotates with respect to the first rotation member 4201. As a result, an operation of the cover member 260 first rotating with respect to the hinge module 400 to be opened may be implemented similar to FIG. 5.

Referring back to FIG. 19(b), to maximize a space utilization of the lower hinge module 400-2, the first roller 451 and the second roller 452 are disposed on one side based on the guide hole 432 formed in the holder 430, the elastic member 410 is disposed on the other side, the seating hole 422 of the first rotation member 4201 is formed inwardly, and the seating hole 422 of the second rotation member 4202 is formed outwardly. Also, the auxiliary circuit 220 having the stepped shape may pass through the hinge module 400. Due to the stepped shape of the auxiliary circuit 220, the elastic member 410 is provided in the first rotation member 4201 only. Since the elastic member 410 is provided in the first rotation member 4201 only, the torque transmitting member 502 may connect the second rotation member 4202 of the upper hinge module 400-1 and the second rotation member 4202 of the lower hinge module 400-2 as complementation.

Figure 20:
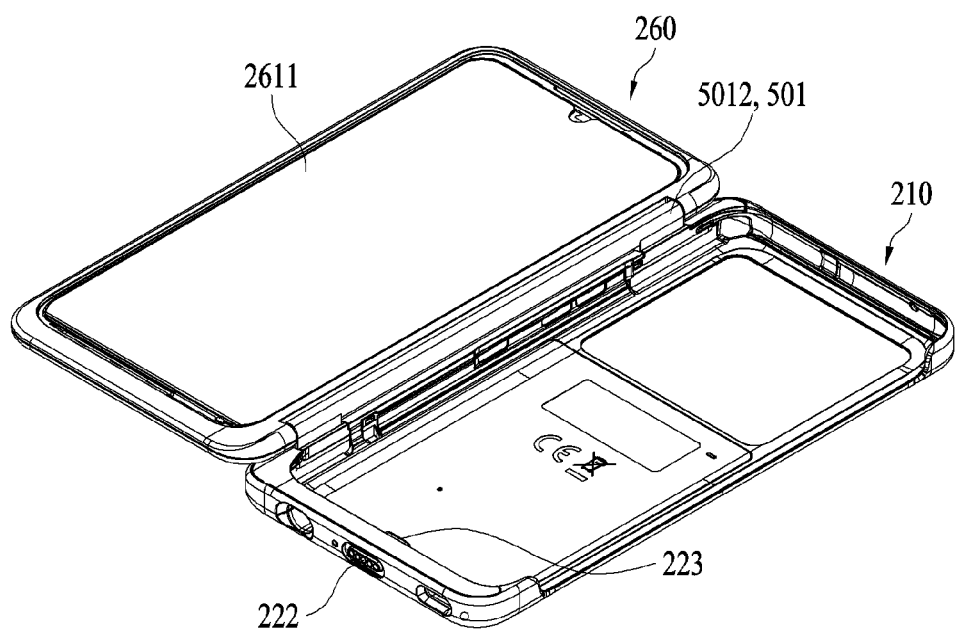
FIG. 20 illustrates an example embodiment of an auxiliary device related to the present disclosure.

FIG. 20 illustrates an example embodiment of the auxiliary device 200 related to the present disclosure. A reference will be made along with FIGS. 7, 8, and 18 for ease of description.

A hinge cover 501 may cover the upper hinge module 400-1, the lower hinge module 400-2, and the torque transmitting member 502. In other words, the hinge cover 501 may be provided all over the upper hinge module 400-1, the torque transmitting member 502, and the lower hinge module 400-2. The hinge cover 501 may be implemented as a combination of an outer hinge cover 5011 and an inner hinge cover 5012.

The hinge cover 501 may realize a neat appearance of the auxiliary device 200 since a rotational state of the hinge module 400 is not exposed to anywhere inside or outside the auxiliary device 200 even when the cover member 260 is opened and closed. Also, the cover member 260 and the seating member 210 may be connected like one piece, thereby providing the neat appearance and minimizing a possibility of inflow of foreign substances such as dust.

Figure 21:
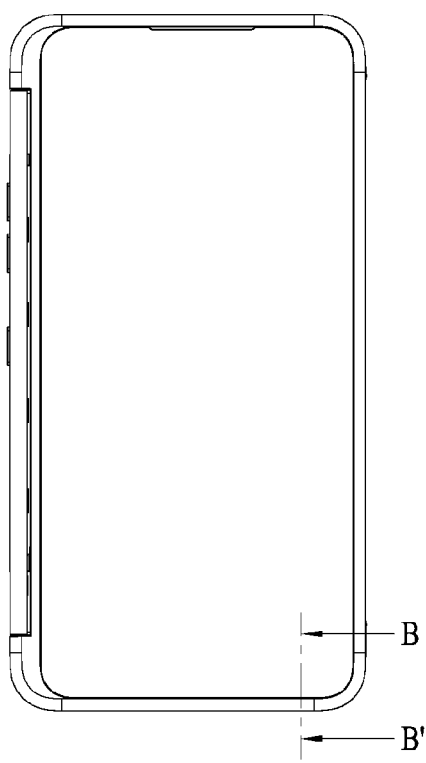
FIG. 21 illustrates an auxiliary device according to an example embodiment of the present disclosure and a cross-sectional view of the auxiliary device taken along a line B-B'.
Figure 21:
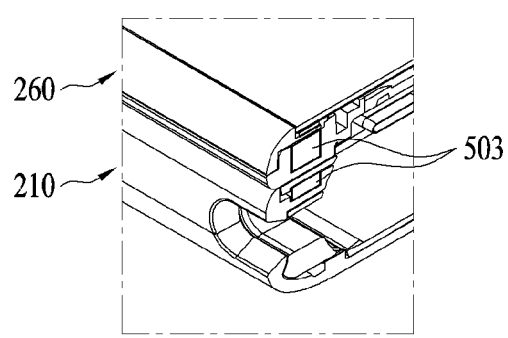

FIG. 21 illustrates the auxiliary device 200 and a cross-sectional view of the auxiliary device 200 taken along a line B-B' according to an example embodiment of the present disclosure.

A pair of magnets 503 may be provided in the cover member 260 and the seating member 210 to generate a mutual attractive force. The pair of magnets 503 may be provided at positions of the cover member 260 and the seating member 210 to face each other when the seating area 2101 of the seating member 210 is fully closed by the cover member 260. Through this, an attached state may be maintained when the seating member 210 is closed by the cover member 260.

Figure 22:
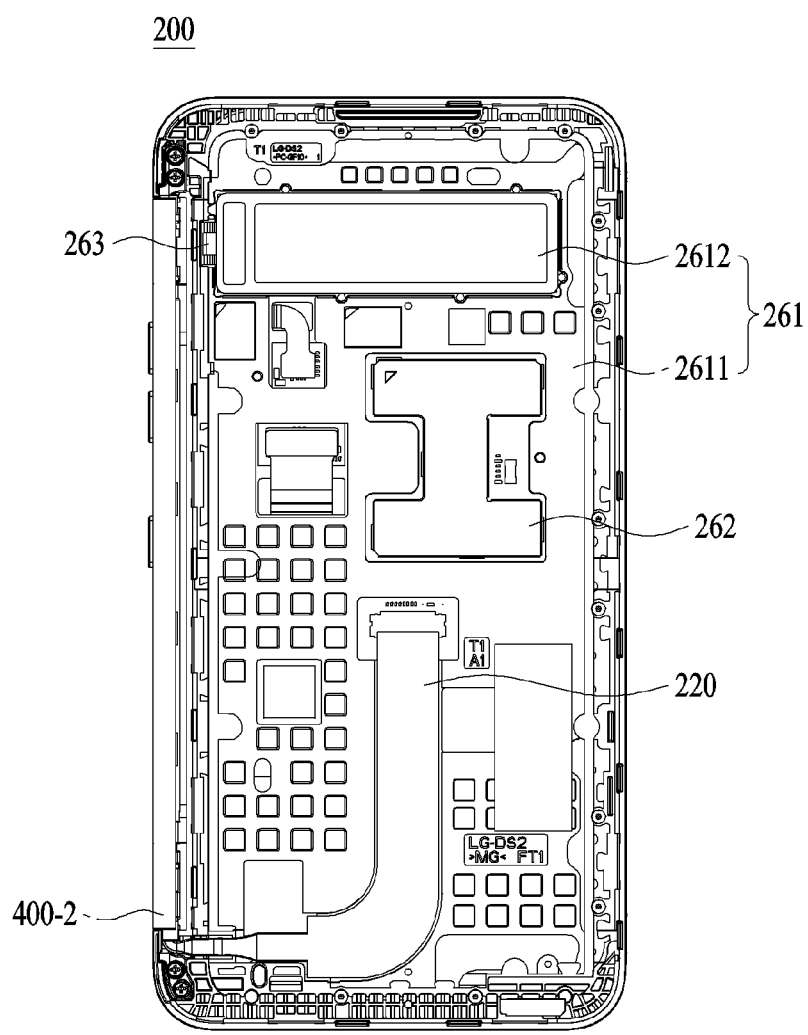
FIG. 22 illustrates a state before and after an upper plate of a cover member is removed in an auxiliary device related to the present disclosure.

FIG. 22 illustrates a state before and after an upper plate of the cover member 260 is removed in the auxiliary device 200 related to the present disclosure.

The auxiliary circuit 220 may be connected to an inner auxiliary display 2611 and an outer auxiliary display 2612 to supply power of data to each component. The auxiliary circuit 220 may enter the cover member 260 from the seating member 210 through the lower hinge module 400-2 along one strand, be branched at one point between the inner auxiliary display 2611 and the lower hinge module 400-2, and then be connected to the outer auxiliary display 2612 and the inner auxiliary display 2611. The auxiliary display controller 262 may output information on the outer auxiliary display 2612 via a flexible circuit board.

BEST MODE FOR CARRYING OUT THE INVENTION

The above detailed description is not to be construed as limiting in all respects, but should be considered as illustrative. The scope of the present disclosure should be determined by reasonable interpretation of the appended claims, and all changes within the equivalent scope of the present disclosure are included in the scope of the present disclosure.

INDUSTRIAL APPLICABILITY

The features of the present disclosure may be applied in part of in whole to a mobile terminal and an auxiliary device coupled to the mobile terminal.

The invention claimed is:

1. An auxiliary device comprising:
a seating member configured to form a seating area that is shaped to receive a mobile terminal;
a cover member connected to one edge of the seating member; and
a hinge module configured to rotatably connect the cover member to the seating member,
wherein the hinge module comprises:
a holder;
a rotation member comprising a first rotation member fixed to the seating member to form a first rotation axis between the holder and the seating member, and a second rotation member fixed to the cover member to form a second rotation axis between the holder and the cover member, the second rotation axis being parallel with the first rotation axis; and
an elastic member configured to elastically press the rotation member to prevent a rotation due to a predetermined magnitude of force or less,
wherein the rotation member has a circular cross-section including a cutout area,
wherein the elastic member has a shape corresponding to the cross-section of the rotation member, and
wherein when the cutout area and a corresponding area of the elastic member are located to be less than a predetermined angle range, the rotation member is configured to rotate such that the cutout area is coincident with the corresponding area of the elastic member.

2. The auxiliary device of claim 1, wherein a rotation angle at which the rotation member rotates such that the cutout area is coincident with the corresponding area of the elastic member corresponds to a rotation angle at which the cover member fully covers the seating area of the seating member.

3. The auxiliary device of claim 2, further comprising:
a pair of magnets provided at each position of the cover member and the seating member facing when the cover member fully covers the seating area of the seating member, to generate a mutual attractive force.

4. The auxiliary device of claim 1, wherein the cutout area is provided as a plurality of cutout areas on a single rotation member.

5. An auxiliary device comprising:
a seating member configured to form a seating area that is shaped to receive a mobile terminal;
a cover member connected to one edge of the seating member; and
a hinge module configured to rotatably connect the cover member to the seating member,
wherein the hinge module comprises:
a holder;
a rotation member comprising a first rotation member fixed to the seating member to form a first rotation axis between the holder and the seating member, and a second rotation member fixed to the cover member to form a second rotation axis between the holder and the cover member, the second rotation axis being parallel with the first rotation axis; and an elastic member configured to elastically press the rotation member to prevent a rotation due to a predetermined magnitude of force or less, a first cam and a first roller respectively provided in the first rotation member and the holder and configured to relatively rotate in response to rotation of the first rotation member to change a degree of mutual pressurization; and a second cam and a second roller respectively provided in the second rotation member and the holder and configured to relatively rotate in response to rotation of the first rotation member to change a degree of mutual pressurization.

6. An auxiliary device comprising:

a seating member configured to form a seating area that is shaped to receive a mobile terminal;

a cover member connected to one edge of the seating member;

a hinge module configured to rotatably connect the cover member to the seating member and including an upper hinge module provided at an upper side of the one edge and a lower hinge module provided at a lower side of the one edge;

an inner auxiliary display configured to form an output area on an inner surface of the cover member; and an auxiliary circuit provided all over the inner auxiliary display, one hinge module selected from the upper hinge module and the lower hinge module, and the seating member, wherein the hinge module comprises:

a holder;

a rotation member comprising a first rotation member fixed to the seating member to form a first rotation axis between the holder and the seating member, and a second rotation member fixed to the cover member to form a second rotation axis between the holder and the cover member, the second rotation axis being parallel with the first rotation axis; and an elastic member configured to elastically press the rotation member to prevent a rotation due to a predetermined magnitude of force or less, and wherein the one hinge module comprises:

a seating hole that forms an area in each of the first rotation member and the second rotation member to sit the auxiliary circuit therein; and a guide hole formed in the holder and connecting a seating hole of the first rotation member and a seating hole of the second rotation member to form a seating area of the auxiliary circuit.

7. The auxiliary device of claim 6, wherein the seating hole of the first rotation member is formed inwardly in a longitudinal direction of the one edge based on the guide hole, and the seating hole of the second rotation member is formed outwardly in the longitudinal direction of the one edge based on the guide hole.

8. The auxiliary device of claim 7, wherein an elastic member on a side of the one hinge module is disposed outwardly in the longitudinal direction of the one edge based on the guide hole and configured to elastically press the second rotation member.

9. The auxiliary device of claim 6, further comprising:

an outer auxiliary display configured to form an output area on an outer surface of the cover member, wherein the auxiliary circuit is branched at a point between the inner auxiliary display and the one hinge module to be electrically connected to the outer auxiliary display.

* * * * *